United States Patent
Hashimoto et al.

(10) Patent No.: US 10,483,503 B2
(45) Date of Patent: Nov. 19, 2019

(54) BATTERY PACKAGING MATERIAL

(71) Applicant: DAI NIPPON PRINTING CO., LTD., Tokyo (JP)

(72) Inventors: Yohei Hashimoto, Tokyo (JP); Rikiya Yamashita, Tokyo (JP); Yaichiro Hori, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 442 days.

(21) Appl. No.: 14/778,904

(22) PCT Filed: Mar. 19, 2014

(86) PCT No.: PCT/JP2014/057606
§ 371 (c)(1),
(2) Date: Sep. 21, 2015

(87) PCT Pub. No.: WO2014/156904
PCT Pub. Date: Feb. 10, 2014

(65) Prior Publication Data
US 2016/0049621 A1   Feb. 18, 2016

(30) Foreign Application Priority Data

Mar. 25, 2013 (JP) .................. 2013-062992
Mar. 25, 2013 (JP) .................. 2013-062995
Sep. 25, 2013 (JP) .................. 2013-198617

(51) Int. Cl.
*H01M 2/02* (2006.01)
*B32B 7/12* (2006.01)
(Continued)

(52) U.S. Cl.
CPC .............. *H01M 2/0292* (2013.01); *B32B 7/12* (2013.01); *B32B 15/08* (2013.01); *B32B 27/18* (2013.01);
(Continued)

(58) Field of Classification Search
CPC .............. H01M 2/0277; H01M 2/0292; B32B 2255/26; B32B 7/12; B32B 15/08;
(Continued)

(56) References Cited

U.S. PATENT DOCUMENTS 7,048,822 B2   5/2006 Yamashita et al.
7,285,334 B1 * 10/2007 Yamashita .......... H01M 2/0267
                                                          428/220

(Continued)

FOREIGN PATENT DOCUMENTS

JP   H06-25388 A   2/1994
JP   H07-205387 A  8/1995
(Continued)

OTHER PUBLICATIONS

"Packaging material for polymer battery and manufacturing method thereof" by Yamashita Rikiya et al. in JP 2001-229887 (A)—Aug. 24, 2001 (Year: 2001).*

(Continued)

*Primary Examiner* — Cynthia H Kelly
*Assistant Examiner* — Omar M Kekia
(74) *Attorney, Agent, or Firm* — Oliff PLC

(57) ABSTRACT

The purpose of the present invention is to provide a film-like battery packaging material in which a coating layer, which can be cured in a short time and exhibits superior chemical resistance, is provided to a substrate layer surface. In the battery packaging material, which comprises a laminate body that includes at least a coating layer, a substrate layer, an adhesive layer, a barrier layer, and a sealant layer, in that order, the use of a resin composition containing a heat-curable resin and a curing accelerator as the coating layer enables the formation of a coating layer that can be cured in a short time and contributes to electrolyte liquid, etc., resistance.

17 Claims, 1 Drawing Sheet

(51) Int. Cl.

| | | |
|---|---|---|
| *B32B 15/08* | (2006.01) | |
| *B32B 27/18* | (2006.01) | |
| *B32B 27/26* | (2006.01) | |
| *B32B 27/30* | (2006.01) | |
| *B32B 27/34* | (2006.01) | |
| *B32B 27/36* | (2006.01) | |
| *B32B 27/38* | (2006.01) | |
| *B32B 27/40* | (2006.01) | |
| *B32B 27/42* | (2006.01) | |

(52) U.S. Cl.
CPC ............ *B32B 27/26* (2013.01); *B32B 27/308* (2013.01); *B32B 27/34* (2013.01); *B32B 27/36* (2013.01); *B32B 27/38* (2013.01); *B32B 27/40* (2013.01); *B32B 27/42* (2013.01); *H01M 2/0277* (2013.01); *H01M 2/0287* (2013.01); *B32B 2255/10* (2013.01); *B32B 2255/26* (2013.01); *B32B 2264/025* (2013.01); *B32B 2264/0292* (2013.01); *B32B 2307/714* (2013.01); *B32B 2307/746* (2013.01); *B32B 2439/00* (2013.01); *B32B 2457/10* (2013.01)

(58) Field of Classification Search
CPC ....... B32B 27/18; B32B 27/26; B32B 27/308; B32B 27/34; B32B 27/36; B32B 27/38; B32B 27/40; B32B 27/42; B32B 2307/714; B32B 2307/746; B32B 2439/00
USPC .................................. 429/176, 185; 156/280
See application file for complete search history.

(56) References Cited

U.S. PATENT DOCUMENTS

| | | | |
|---|---|---|---|
| 8,067,113 B2 | 11/2011 | Yamashita et al. | |
| 2006/0172191 A1* | 8/2006 | Yamashita | .......... H01M 2/0275 429/176 |
| 2009/0214876 A1* | 8/2009 | Kano | ...................... C23C 18/31 428/423.1 |
| 2010/0004356 A1 | 1/2010 | Yoshinaga et al. | |
| 2010/0015451 A1 | 1/2010 | Suzuta | |
| 2012/0034477 A1 | 2/2012 | Yamashita et al. | |
| 2012/0135301 A1 | 5/2012 | Akita et al. | |
| 2012/0258353 A1 | 10/2012 | Yamashita et al. | |
| 2013/0280455 A1* | 10/2013 | Evans | .................. C08G 59/066 428/35.8 |
| 2014/0087241 A1 | 3/2014 | Kuramoto et al. | |

FOREIGN PATENT DOCUMENTS

| | | | | |
|---|---|---|---|---|
| JP | H09-39161 A | 2/1997 | | |
| JP | H09-283876 A | 10/1997 | | |
| JP | 2001-113642 A | 4/2001 | | |
| JP | 2001-202927 A | 7/2001 | | |
| JP | 2001229887 A | * | 8/2001 | ............. H01M 2/02 |
| JP | 2002-056823 A | 2/2002 | | |
| JP | 2002-201437 A | 7/2002 | | |
| JP | 2002-201449 A | 7/2002 | | |
| JP | 2003-072295 A | 3/2003 | | |
| JP | 2006-342238 A | 12/2006 | | |
| JP | 2009-105361 A | 5/2009 | | |
| JP | 2010-086831 A | 4/2010 | | |
| JP | 2011-054563 A | 3/2011 | | |
| JP | 2011-187386 A | 9/2011 | | |
| JP | 2012-212544 A | 11/2012 | | |
| WO | 2008/047700 A1 | 4/2008 | | |
| WO | 2008/093778 A1 | 8/2008 | | |
| WO | 2012/133663 A1 | 10/2012 | | |

OTHER PUBLICATIONS

Jun. 17, 2014 International Search Report issued in International Patent Application No. PCT/JP2014/057607.
May 19, 2016 Office Action Issued in U.S. Appl. No. 14/779,610.
Nov. 3, 2016 European Search Report issued in European Patent Application No. 14775806.4.
Nov. 3, 2016 European Search Report issued in European Patent Application No. 14773090.7.
Jul. 1, 2014 International Search Report issued in International Patent Application No. PCT/JP2014/057606.
Feb. 20, 2018 Office Action issued in Japanese Patent Application No. 2017-087296.
Feb. 20, 2018 Office Action issued in Japanese Patent Application No. 2017-091038.

* cited by examiner

BATTERY PACKAGING MATERIAL

TECHNICAL FIELD

The present invention relates to a film-shaped battery packaging material including a base material layer, the surface of which is provided with a coating layer which can be quickly cured and can exhibit resistance to an electrolytic solution etc.

BACKGROUND ART

Various types of batteries have been developed heretofore, and in every battery, a packaging material is an essential member for sealing battery elements such as an electrode and an electrolyte. Metallic packaging materials have often been used heretofore as battery packaging materials, but in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, a film-shaped laminate including a base material layer, an adhesive layer, a barrier layer and a sealant layer laminated in this order has been proposed as a battery packaging material which is easily processed into diverse shapes and which can be thinned and lightened (see, for example, Patent Document 1). The film-shaped battery packaging material is formed in such a manner that a battery element can be sealed by heat-welding the peripheral edge by heat sealing with the sealant layers facing each other.

Meanwhile, in a manufacturing site of batteries, chemicals such as an electrolytic solution, an acid, an alkali and an organic solvent are used, and therefore a film-shaped battery packaging material is required to have chemical resistance so that degradation, degeneration, damage or the like does not occur even if such a chemical adheres to the battery packaging material. It has been previously known that by providing a coating layer on a surface of a base material layer of a film-shaped battery packaging material (surface opposite to an adhesive layer) using a thermosetting resin, chemical resistance can be imparted to the battery packaging material. However, a two-pack type curable resin has been used heretofore for forming a coating layer using a thermosetting resin, and thus it is required to perform aging under a high-temperature condition for several days to several weeks for curing the resin. Therefore, there has been the problem that the lead time is increased, so that product defects occur due to exposure to the high-temperature condition for a long period of time. On the other hand, for suppressing product defects resulting from aging under a high-temperature condition as described above, it is effective to cure the two-pack type curable resin quickly (in a short time) by increasing the curing temperature of the resin. However, in conventional techniques, there is the disadvantage that when the two-pack type curable resin is quickly cured, curing of the thermosetting resin does not sufficiently proceed, and resultantly, sufficient chemical resistance cannot be imparted to the coating layer.

In view of the conventional techniques, it is earnestly desired to develop a technique for forming on a base material layer of a film-shaped battery packaging material a coating layer which can be quickly cured, and has excellent chemical resistance.

PRIOR ART DOCUMENT

Patent Document

Patent Document 1: Japanese Patent Laid-open Publication No. 2001-202927

SUMMARY OF THE INVENTION

Problems to be Solved by the Invention

An object of the present invention is to provide a film-shaped battery packaging material including a base material layer, the surface of which is provided with a coating layer which can be quickly cured, and has excellent chemical resistance.

Means for Solving the Problems

The present inventors have extensively conducted studies for achieving the above-mentioned object, and resultantly found the following matter: in a battery packaging material which includes a laminate including at least a coating layer, a base material layer, an adhesive layer, a barrier layer and a sealant layer in this order, when a resin composition containing a thermosetting resin and a curing accelerator is used as the coating layer, a coating layer can be formed which can be quickly cured and can exhibit resistance to an electrolytic solution etc.

The present inventors have found that when the coating layer is formed from a cured product of a resin composition containing a thermosetting resin, a curing accelerator and a reactive slipping agent, the coating layer also serves as a coating layer having slip properties, the coating layer can be quickly cured, and moreover, detachment of the slipping agent in the coating layer can be suppressed, so that an excellent slipping effect can be exhibited.

Further, the present inventors have found that when the coating layer is formed from a cured product of a resin composition containing a thermosetting resin and reactive resin beads, maintenance performance of chemical resistance is improved while excellent scratch resistance is imparted to the coating layer. Further, the present inventors have found that when the content of the reactive resin beads falls within a predetermined range, the film strength of the coating layer can be increased to suppress breakage of the coating layer.

The present invention has been completed by further conducting studies based on the above-mentioned findings.

That is, the present invention provides an invention of the aspects described below.

Item 1. A battery packaging material which includes a laminate including at least a coating layer, a base material layer, an adhesive layer, a barrier layer and a sealant layer in this order, wherein
the coating layer is a cured product of a resin composition containing a thermosetting resin and a curing accelerator.

Item 2. The battery packaging material according to item 1, wherein the thermosetting resin is a thermosetting resin having a polyaromatic backbone and/or a heterocyclic backbone.

Item 3. The battery packaging material according to item 1 or 2, wherein the thermosetting resin is at least one selected from the group consisting of an epoxy resin, an amino resin, an acrylic resin, a urethane resin, a phenol resin, an unsaturated polyester resin and an alkyd resin.

Item 4. The battery packaging material according to any one of items 1 to 3, wherein the coating layer is a cured product of a resin composition containing a thermosetting resin, a curing accelerator and a slipping agent.

Item 5. The battery packaging material according to item 4, wherein the reactive slipping agent is a reactive slipping agent having 1 to 3 functional groups that react with the thermosetting resin to be chemically bonded to the thermosetting resin.

Item 6. The battery packaging material according to any one of items 1 to 5, wherein the coating layer is a cured product of a resin composition containing a thermosetting resin, a curing accelerator and reactive resin beads.

Item 7. The battery packaging material according to item 6, wherein the reactive resin beads are urethane resin beads or acrylic resin beads having a functional group.

Item 8. The battery packaging material according to item 6 or 7, wherein the reactive resin beads are contained in an amount of 0.1 to 30 parts by mass based on 100 parts by mass of the thermosetting resin.

Item 9. The battery packaging material according to any one of items 6 to 8, wherein the refractive index of the reactive resin beads is 1.3 to 1.8.

Item 10. The battery packaging material according to any one of items 1 to 9, wherein the curing accelerator is at least one selected from the group consisting of an amidine compound, a carbodiimide compound, a ketimine compound, a hydrazine compound, a sulfonium salt, a benzothiazolium salt and a tertiary amine compound.

Item 11. The battery packaging material according to any one of items 1 to 10, wherein the barrier layer is a metal foil.

Item 12. A method for producing a battery packaging material which includes a laminate including a coating layer, a base material layer, an adhesive layer, a barrier layer and a sealant layer in this order, the method including:

a first step of laminating a base material layer and a barrier layer with an adhesive layer interposed therebetween to form a laminate including the base material layer, the adhesive layer and the barrier layer laminated in this order; and a second step of laminating a sealant layer on the barrier layer of the laminate obtained in the first step, wherein before the first step, after the first step and before the second step, or after the second step, a resin composition containing a thermosetting resin and a curing accelerator is applied to a surface of the base material layer on a side opposite to a surface thereof on which the adhesive layer is laminated, and the resin composition is heated and cured to form a coating layer.

Item 13. A method for producing a battery packaging material which includes a laminate including a coating layer, a base material layer, an adhesive layer, a barrier layer and a sealant layer in this order, the method including:

a first step of laminating a base material layer and a barrier layer with an adhesive layer interposed therebetween to form a laminate including the base material layer, the adhesive layer and the barrier layer laminated in this order; and a second step of laminating a sealant layer on the barrier layer of the laminate obtained in the first step, wherein before the first step, after the first step and before the second step, or after the second step, a resin composition containing a thermosetting resin, a curing accelerator and a reactive slipping agent is applied to a surface of the base material layer on a side opposite to a surface thereof on which the adhesive layer is laminated, and the resin composition is heated and cured to form a coating layer.

Item 14. The method for producing a battery packaging material according to item 12 or 13, wherein the resin composition further contains reactive resin beads.

Item 15. A battery, wherein a battery element including at least a positive electrode, a negative electrode and an electrolyte is stored in the battery packaging material according to any one of items 1 to 11.

Advantages of the Invention

The battery packaging material according to the present invention has a coating layer provided on an outermost surface thereof on a side opposite to a sealant layer, the coating layer being formed using a resin composition containing a thermosetting resin and a curing accelerator, being formed of a firm cured film and having chemical resistance, so that the battery packaging material has excellent resistance to chemicals such as an electrolytic solution, an acid, an alkali, and an organic solvent. The coating layer in the battery packaging material according to the present invention can be quickly cured without requiring aging under a high-temperature condition, so that the lead time can be reduced, and further, occurrence of product defects due to exposure to a high-temperature condition for a long period of time can be prevented.

In the battery packaging material according to the present invention, when the coating layer is a cured product of a resin composition containing a thermosetting resin, a curing accelerator and a slipping agent, the coating layer also serves as a coating layer having slipping properties. The coating layer containing a reactive slipping agent is provided on an outermost surface on a side opposite to the sealant layer, and therefore moldability/processability in press molding and embossing, and operability are improved because the coating layer has an excellent slipping effect. In the battery packaging material according to the present invention, the slipping agent contained in the coating layer is chemically bonded to the curable resin, and therefore the slipping agent is hard to be bled and lost from the coating layer due to elapse of time, exposure to a high-temperature atmosphere, or the like, so that occurrence of powdering or offset at the time of use can be suppressed to prevent deterioration of the slipping effect of the coating layer. Further, in the battery packaging material according to the present invention, the coating layer contains a curing accelerator, and therefore can be quickly cured without requiring aging under a high-temperature condition, so that the lead time can be reduced, and hence occurrence of product defects due to exposure to a high-temperature condition for a long period of time can be prevented.

Further, in the battery packaging material according to the present invention, when reactive resin beads are used for formation of the coating layer, the reactive resin beads are chemically bonded to the curable resin in the coating layer, and cause fine irregularities to be formed on the surface of the coating layer. The fine irregularities reduce the area of contact between a matter that gives scratches and the coating layer, and therefore excellent scratch resistance is achieved. The battery packaging material has excellent resistance to chemicals such as an electrolytic solution, an acid, an alkali and an organic solvent (chemical resistance), and can stably maintain the chemical resistance.

When the content of the reactive resin beads in the coating layer falls within a predetermined range, the film strength can be increased to suppress breakage of the coating layer.

EMBODIMENTS OF THE INVENTION

A battery packaging material according to the present invention includes a laminate including at least a coating layer, a base material layer, an adhesive layer, a barrier layer and a sealant layer in this order, wherein the coating layer is a cured product of a resin composition containing a thermosetting resin and a curing accelerator. Hereinafter, the battery packaging material according to the present invention will be described in detail.

1. Laminated Structure of Battery Packaging Material

Figure 1:
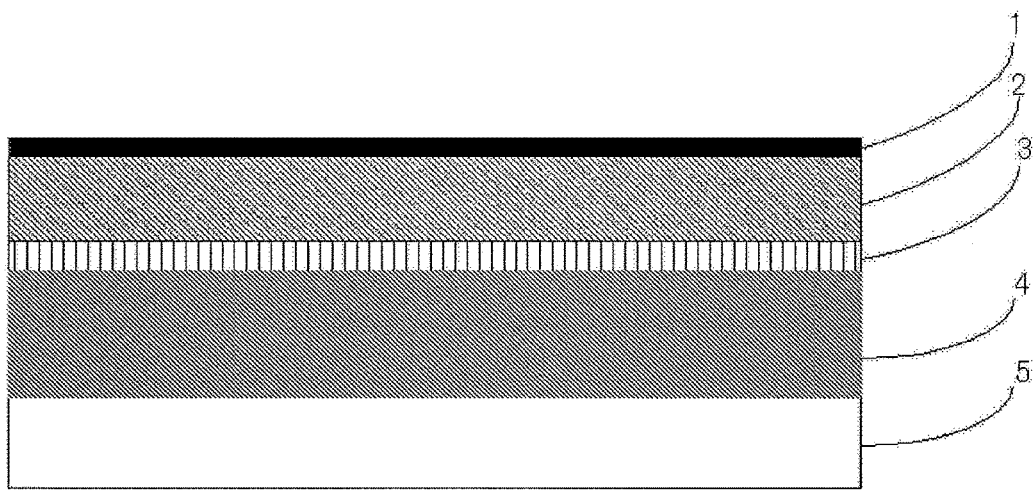
FIG. 1 is a drawing showing one example of a cross-sectional structure of a battery packaging material according to the present invention.
Figure 2:
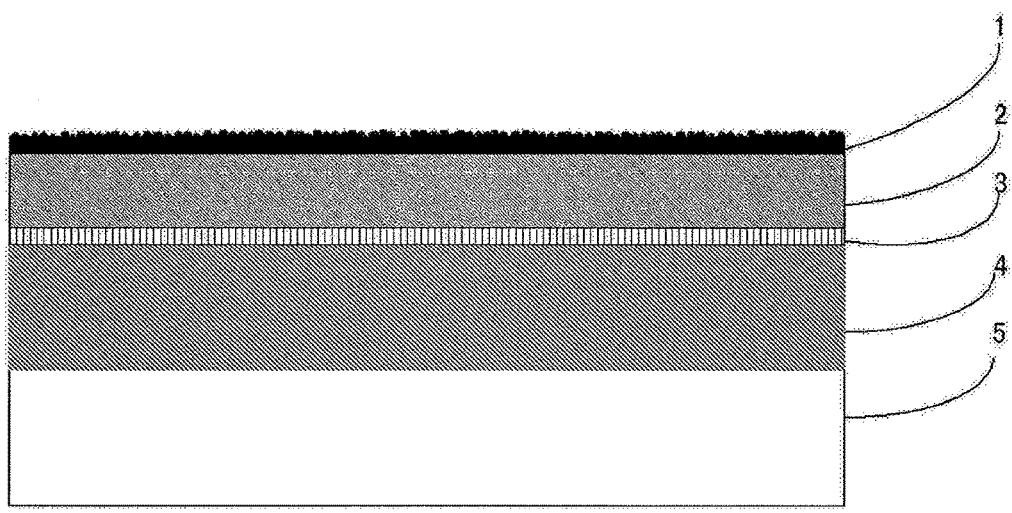
FIG. 2 is a drawing showing one example of a cross-sectional structure of a battery packaging material according to the present invention when reactive resin beads are used for formation of a coating layer.

The battery packaging material has a laminated structure which includes a laminate including at least a coating layer 1, a base material layer 2, an adhesive layer 3, a barrier layer 4 and a sealant layer 5 in this order as shown in FIG. 1. That is, the battery packaging material according to the present invention has the coating layer 1 as the outermost layer and the sealant layer 5 as the innermost layer. During construction of a battery, the sealant layers 5 situated on the peripheral edge of a battery element are brought into contact with each other, and heat-welded to hermetically seal the battery element, so that the battery element is encapsulated.

The battery packaging material according to the present invention may have an adhesive layer 6 provided between the barrier layer 4 and the sealant layer 5 as necessary for the purpose of improving adhesion between the layers.

2. Compositions of Layers Forming Battery Packaging Material

[Coating Layer 1]

In the battery packaging material according to the present invention, the coating layer 1 is a layer that forms the outermost layer as a surface coating layer for the base material layer 2. The coating layer 1 is formed from a cured product of a resin composition containing a thermosetting resin and a curing accelerator. When the coating layer 1 is thus formed by curing a resin composition having a specific composition, the coating layer 1 has excellent resistance to chemicals such as an electrolytic solution, an acid, an alkali and an organic solvent, and can be quickly cured without requiring aging under a high-temperature condition during production, leading to reduction of the lead time. As described above, in the battery packaging material according to the present invention, when the coating layer 1 is a cured product of a resin composition containing a slipping agent in addition to a thermosetting resin and a curing accelerator, the coating layer 1 also serves as the coating layer 1.

(Thermosetting Resin)

The resin composition to be used for formation of the coating layer 1 contains a thermosetting resin. The thermosetting resin is not limited as long as it is polymerized when heated to form a high-molecular network structure, and cured. Specific examples of the thermosetting resin to be used for formation of the coating layer 1 include epoxy resins, amino resins (melamine resins, benzoguanamine resins and the like), acrylic resins, urethane resins, phenol resins, unsaturated polyester resins and alkyd resins.

These thermosetting resins may be used alone, or may be used in combination of two or more thereof.

Among these thermosetting resins, urethane resins and epoxy resins are preferred, and two-pack type curable urethane resins and two-pack type curable epoxy resins are further preferred, with two-pack type curable urethane resins being especially preferred for further reduction of the curing time of the coating layer 1, further improvement of chemical resistance, and so on.

Specific examples of the two-pack type curable urethane resin include combinations of a polyol compound (main agent) and an isocyanate-based compound (curing agent), and specific examples of the two-pack type curable epoxy resin include combinations of an epoxy resin (main agent) and an acid anhydride, an amine compound or an amino resin (curing agent).

The polyol compound to be used as a main agent in the two-pack type curable urethane resin is not particularly limited, and examples thereof include polyester polyols, polyester polyurethane polyols, polyether polyols and polyether polyurethane polyols. These polyol compounds may be used alone, or may be used in combination of two or more thereof.

The isocyanate-based compound to be used as a curing agent in the two-pack type curable urethane resin is not particularly limited, and examples thereof include polyisocyanates, adducts thereof, isocyanurate-modified products thereof, carbodiimide-modified products thereof, allophanate-modified products thereof, and biuret-modified products thereof. Specific examples of the polyisocyanate include aromatic diisocyanates such as diphenylmethane diisocyanate (MDI), polyphenylmethane diisocyanate (polymeric MDI), toluene diisocyanate (TDI), hexamethylene diisocyanate (HDI), bis(4-isocyanatecyclohexyl)methane (H12MDI), isophorone diisocyanate (IPDI), 1,5-naphthalene diisocyanate (1,5-NDI), 3,3'-dimethyl-4,4'-diphenylene diisocyanate (TODI) and xylene diisocyanate (XDI); aliphatic diisocyanates such as tetramethylene diisocyanate, hexamethylene diisocyanate, trimethylhexamethylene diisocyanate and isophorone diisocyanate; cycloaliphatic diisocyanates such as 4,4'-methylene-bis(cyclohexylisocyanate) and isophorone diisocyanate; and polyaromatic diisocyanates such as 1,5-naphthalene diisocyanate (1,5-NDI). Specific examples of the adduct include those obtained by adding trimethylolpropane, glycol or the like to the polyisocyanate. These isocyanate-based compounds may be used alone, or may be used in combination of two or more thereof.

In the coating layer 1, since the thermosetting resin is used in combination with a curing accelerator as described later, a firm cured film can be formed to achieve excellent chemical resistance. Therefore, the structure of the thermosetting resin is not particularly limited, but a thermosetting resin having a polyaromatic backbone and/or a heterocyclic backbone is especially suitably used in formation of the coating layer 1 because further excellent chemical resistance can be achieved. Specific examples of the thermosetting resin having a polyaromatic backbone include epoxy resins having a polyaromatic backbone, and urethane resins having a polyaromatic backbone. Examples of the thermosetting resin having a heterocyclic backbone include amino resins such as melamine resins and benzoguanamine resins. The thermosetting resin having a polyaromatic backbone and/or a heterocyclic backbone may be a one-pack type curable resin or a two-pack type curable resin.

More specific examples of the epoxy resin having a polyaromatic backbone include reaction products of dihydroxynaphthalene and epihalohydrin; reaction products of a condensate of naphthol and an aldehyde (naphthol novolac resin) and epihalohydrin; reaction products of a condensate of dihydroxynaphthalene and an aldehyde, and epihalohydrin; reaction products of a condensate of mono- or dihydroxynaphthalene and a xylylene glycol, and epihalohydrin; adducts of mono- or dihydroxynaphthalene and a diene compound, and epihalohydrin; and reaction products of a polynaphthol with naphthols coupled with each other, and epihalohydrin.

More specific examples of the urethane resin having a polyaromatic backbone include reaction products of a polyol compound and an isocyanate-based compound having a polyaromatic backbone.

(Curing Accelerator)

The resin composition to be used for formation of the coating layer 1 contains a curing accelerator.

When a thermosetting resin and a curing accelerator coexist as described above, not only excellent chemical resistance is achieved, but also the coating layer 1 is quickly cured without requiring aging under a high-temperature condition during production, so that the lead time can be reduced.

Here, the "curing accelerator" is a substance that does not form a crosslinked structure by itself, but accelerates a crosslinking reaction of a thermosetting resin, or a substance that acts to accelerate a crosslinking reaction of a thermosetting resin, and may form a crosslinked structure by itself.

The type of the curing accelerator is appropriately selected according to a thermosetting resin to be used, and examples thereof include amidine compounds, carbodiimide compounds, ketimine compounds, hydrazine compounds, sulfonium salts, benzothiazolium salts and tertiary amine compounds.

The amidine compound is not particularly limited, and examples thereof include imidazole compounds, 1,8-diazabicyclo[5.4.0]undec-7-ene (DBU), 1,5-diazabicyclo[4.3.0]non-5-ene (DBN) and guanidine compounds. Specific examples of the imidazole compound include 2-methylimidazole, 2-ethylimidazole, 2-undecylimidazole, 2,4-dimethylimidazole, 2-heptadecylimidazole, 1,2-dimethylimidazole, 1,2-diethylimidazole, 2-ethyl-4-methylimidazole, 2-phenylimidazole, 1-benzyl-2-phenylimidazole, 1-cyanoethyl-2-methylimidazole, 1-cyanoethyl-2-undecylimidazole, 1-benzyl-2-methylimidazole, 2,4-diamino-6-[2'-methylimidazolyl-(1)']-ethyl-S-triazine, 2,4-diamino-6-[2'-ethyl-4'-methylimidazolyl-(1)']-ethyl-S-triazine, 2,4-diamino-6-[2'-undecylimidazolyl-(1)']-ethyl-S-triazine, 2,4-diamino-6-[2'-methylimidazolyl-(1)']-ethyl-S-triazineisocyanuric acid adducts, 2-phenyl-4-methyl-5-hydroxymethylimidazole, 2-phenyl-4,5-dihydroxymethylimidazole and 2-aryl-4,5-diphenylimidazole. These amidine compounds may be used alone, or may be used in combination of two or more thereof.

The carbodiimide compound is not particularly limited, and examples thereof include N,N'-dicyclohexylcarbodiimide, N,N'-diisopropylcarbodiimide, 1-ethyl-3-(3-dimethylaminopropyl)carbodiimide, N-[3-(dimethylamino)propyl]-N'-ethylcarbodiimide, N-[3-(dimethylamino)propyl]-N'-ethylcarbodiimide methiodide, N-tert-butyl-N'-ethylcarbodiimide, N-cyclohexyl-N'-(2-morpholinoethyl)carbodiimide meso-p-toluenesulfonate, N,N'-di-tert-butylcarbodiimide and N,N'-di-p-tolylcarbodiimide. These carbodiimide compounds may be used alone, or may be used in combination of two or more thereof.

The ketimine compound is not particularly limited as long as it has a ketimine bond (N═C), and examples thereof include ketimine compounds obtained by reacting a ketone with an amine. Specific examples of the ketone include methyl ethyl ketone, methyl isopropyl ketone, methyl tertiary butyl ketone, methyl cyclohexyl ketone, diethyl ketone, ethyl propyl ketone, ethyl butyl ketone, dipropyl ketone, dibutyl ketone and diisobutyl ketone. Specific examples of the amine include aromatic polyamines such as o-phenylenediamine, m-phenylenediamine, p-phenylenediamine, m-xylylenediamine, diaminodiphenylmethane, diaminodiphenylsulfone and diaminodiethyldiphenylmethane; aliphatic polyamines such as ethylenediamine, propylenediamine, butylenediamine, diethylenetriamine, triethylenetetramine, tetraethylenepentamine, pentaethylenehexamine, hexamethylenediamine, trimethylhexamethylenediamine, 1,2-propanediamine, iminobispropylamine and methyliminobispropylamine; monoamines having an ether bond on the main chain and diamines having a polyether backbone, such as N-aminoethylpiperazine and 3-butoxyisopropylamine; cycloaliphatic polyamines such as isophoronediamine, 1,3-bisaminomethylcyclohexane, 1-cyclohexylamino-3-aminopropane, and 3-aminomethyl-3,3,5-trimethylcyclohexylamine; diamines having a norbornane backbone; polyamideamines having an amino group at the molecular end of a polyamide; and 2,5-dimethyl-2,5-hexamethylenediamine, mencenediamine and 1,4-bis(2-amino-2-methylpropyl)piperazine. These ketimine compounds may be used alone, or may be used in combination of two or more thereof.

The hydrazine compound is not particularly limited, and examples thereof include adipic acid dihydrazide and isophthalic acid dihydrazide. These hydrazine compounds may be used alone, or may be used in combination of two or more thereof.

The sulfonium salt is not particularly limited, and examples thereof include alkylsulfonium salts such as 4-acetophenyldimethylsulfonium hexafluoroantimonate, 4-acetophenyldimethylsulfonium hexafluoroarsenate, dimethyl-4-(benzyloxycarbonyloxy)phenylsulfonium hexafluoroantimonate, dimethyl-4-(benzoyloxy)phenylsulfonium hexafluoroantimonate and dimethyl-4-(benzoyloxy)phenylsulfonium hexafluoroarsenate; benzylsulfonium salts such as benzyl-4-hydroxyphenylmethylsulfonium hexafluoroantimonate, 4-acetoxyphenylbenzylmethylsulfonium hexafluoroantimonate, benzyl-4-methoxyphenylmethylsulfonium hexafluoroantimonate, benzyl-3-chloro-4-hydroxyphenylmethylsulfonium hexafluoroarsenate and 4-methoxybenzyl-4-hydroxyphenylmethylsulfonium hexafluorophosphate; dibenzylsulfonium salts such as dibenzyl-4-hydroxyphenylsulfonium hexafluoroantimonate, dibenzyl-4-hydroxyphenylsulfonium hexafluorophosphate, dibenzyl-4-methoxyphenylsulfonium hexafluoroantimonate and benzyl-4-methoxybenzyl-4-hydroxyphenylsulfonium hexafluorophosphate; and substituted benzylsulfonium salts such as p-chlorobenzyl-4-hydroxyphenylmethylsulfonium hexafluoroantimonate, p-nitrobenzyl-4-hydroxyphenylmethylsulfonium hexafluoroantimonate, 3,5-dichlorobenzyl-4-hydroxyphenylmethylsulfonium hexafluoroantimonate and o-chlorobenzyl-3-chloro-4-hydroxyphenylmethylsulfonium hexafluoroantimonate. These sulfonium salts may be used alone, or may be used in combination of two or more thereof.

The benzothiazolium salt is not particularly limited, and examples thereof include benzylbenzothiazolium salts such as 3-benzylbenzothiazolium hexafluoroantimonate, 3-benzylbenzothiazolium hexafluorophosphate, 3-benzylbenzothiazolium tetrafluoroborate, 3-(p-methoxybenzyl)benzothiazolium hexafluoroantimonate, 3-benzyl-2-methylthiobenzothiazolium hexafluoroantimonate and 3-benzyl-5-chlorobenzothiazolium hexafluoroantimonate. These benzothiazolium salts may be used alone, or may be used in combination of two or more thereof.

The tertiary amine compound is not particularly limited, and examples thereof include aliphatic tertiary amines such as trimethylamine, triethylamine, tripropylamine, tributylamine, triethylenediamine, 1,4-diazabicyclo[2.2.2]octane, quinuclidine and 3-quinuclidinol; aromatic tertiary amines such as dimethylaniline; and heterocyclic tertiary amines such as isoquinoline, pyridine, collidine and beta-picoline. These tertiary amine compounds may be used alone, or may be used in combination of two or more thereof.

One preferred example of the curing accelerator is one that serves as a thermal acid generator. The thermal acid generator is a substance that serves as a curing accelerator by generating an acid when it is heated. Specific examples of those that can serve as a thermal acid generator among the above-mentioned curing accelerators include sulfonium salts and benzothiazolium salts.

Another preferred example of the curing accelerator is thermally potential one that is activated under a predetermined heating condition (e.g. 80 to 2000° C., preferably 100 to 160° C.) to accelerate a crosslinking reaction of a thermosetting resin. Specific examples of thermally potential substances among the above-mentioned curing accelerators include epoxy adducts including an epoxy compound added to an amidine compound, a hydrazine compound, a tertiary amine compound or the like.

Another preferred example of the curing accelerator is hydrolytically potential one that does not serve as a curing agent in a hermetically sealed state, i.e. a moisture shut-off state, but is hydrolyzed to serve as a curing agent under moisture-existing conditions obtained by opening the hermetically sealed state. Specific examples of hydrolytically potential substances among the above-mentioned curing accelerators include epoxy adducts including an epoxy compound added to an amidine compound, a hydrazine compound, a tertiary amine compound or the like.

These curing accelerators may be used alone, or may be used in combination of two or more thereof. Among these curing accelerators, amidine compounds and sulfonium salts are preferred, with amidine compounds being further preferred.

The content of the curing accelerator in the resin composition to be used for formation of the coating layer 1 is appropriately determined according to, for example, the type of thermosetting resin and the type of curing accelerator to be used, and for example, the content of the curing accelerator in terms of the total amount is 0.01 to 6 parts by mass, preferably 0.05 to 5 parts by mass, further preferably 0.1 to 2 parts by mass based on 100 parts by mass of the thermosetting resin.

(Other Additives)

The resin composition to be used for formation of the coating layer 1 may contain other additives such a matting agent, a slipping agent, a solvent, an elastomer and a colorant as necessary in addition to the above-mentioned components.

When a matting agent and a slipping agent are incorporated, a slipping effect can be imparted to the coating layer 1, moldability/processability in press molding and embossing can be improved, and operability can be improved. The colorant is not particularly limited, and a known pigment, dye or the like can be used.

The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrenes, crosslinked polyethylenes, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

(Thickness of Coating Layer 1)

The thickness of the coating layer 1 is, for example, 1 to 5 μm, preferably 2 to 4 μm.

As described above, in the battery packaging material according to the present invention, when the coating layer 1 is a cured product of a resin composition containing a thermosetting resin, a curing accelerator and a slipping agent, the coating layer 1 having chemical resistance also serves as the coating layer 1 having slipping properties. In the battery packaging material according to the present invention, the coating layer 1 is a layer that forms the outermost layer as a surface coating layer for the base material layer 2. The coating layer 1 is formed from a cured product of a resin composition containing a thermosetting resin, a curing accelerator and a reactive slipping agent. When the coating layer 1 is thus formed by curing a resin composition having a specific composition, the slipping agent is hard to be bled and lost, and the coating layer can be quickly cured without requiring aging under a high-temperature condition during production, leading to reduction of the lead time.

(Reactive Slipping Agent)

The resin composition to be used for formation of the coating layer 1 contains a reactive slipping agent. In the present invention, due to the use of a reactive slipping agent, the slipping agent is hard to be bled and lost from the coating layer 1, so that occurrence of powdering or offset at the time of use, and deterioration of the slipping effect of the coating layer 1 with time can be suppressed.

The reactive slipping agent is a compound that has a functional group that reacts with and chemically bonds to the thermosetting resin and that can impart (slippage). The type of functional group of the reactive slipping agent is appropriately determined according to the type of the thermosetting resin, and examples thereof include a hydroxyl group, a mercapto group, a hydrolyzable silyl group, an isocyanate group, an epoxy group, a polymerizable vinyl group and a (meth)acryloyl group.

The number of functional groups per molecule in the reactive slipping agent is not particularly limited, and for example, it is 1 to 3, preferably 1 or 2.

Specific examples of the reactive slipping agent include modified silicones having the above-mentioned functional group; modified fluororesins having the above-mentioned functional group; silicone-modified resins having the above-mentioned functional group; compounds in which the above-mentioned functional group is introduced into a fatty acid amide such as stearic acid amide, oleic acid amide, erucic acid amide or ethylene-bis-stearic acid amide; metal soaps including the above-mentioned functional group introduced therein; and paraffins including the above-mentioned functional group introduced therein. These reactive slipping agents may be used alone, or may be used in combination of two or more thereof.

Among these reactive slipping agents, modified silicones having the above-mentioned functional group, fluororesins having the above-mentioned functional group, and silicone-modified resins having the above-mentioned functional group are preferred. Specific examples of the modified silicone include modified silicones in which a polymer having the above-mentioned functional group is block-polymerized, such as modified silicones in which an acrylic resin is block-polymerized; and modified silicones in which a monomer having the above-mentioned functional group is graft-polymerized, such as modified silicones in which an acrylate is graft-polymerized. Specific examples of the modified fluororesin include modified fluororesins in which a monomer having the above-mentioned functional group is graft-polymerized, such as fluororesins in which an acrylate is graft-polymerized; and fluororesins in which a polymer having the above-mentioned functional group is block-polymerized, such as modified fluororesins in which an acrylic resin is block-polymerized. Specific examples of the silicone-modified resin include silicone-modified resins which have the above-mentioned functional group and in which silicone is graft-polymerized, such as silicone-modified acrylic resins in which silicone is graft-polymerized with an acrylic resin having the above-mentioned functional group. Specific examples of the modified fluororesin include modified fluororesins in which a monomer having the above-mentioned functional group is graft-polymerized, such as fluororesins in which an acrylate is graft-polymerized; and fluororesins in which a polymer having the above-mentioned functional group is block-polymerized, such as modified fluororesins in which an acrylic resin is block-polymerized. Examples of the especially preferred reactive slipping agent among those described above include modified silicones in which a monomer or polymer having the above-mentioned functional group is polymerized with one end of silicone; and modified fluororesins in which a monomer or polymer having the above-mentioned functional group is polymerized with one end of a fluororesin. As these modified silicones and modified fluororesins, for example, "MODIPER (registered trademark) F and FS Series" (manufactured by NOF CORPORATION), "SYMAC (registered trademark) Series" (TOAGOSEI CO., LTD.), and so on are commercially available, and these commercial products can also be used.

The content of the reactive slipping agent in the resin composition to be used for formation of the coating layer 1 is not particularly limited, and for example, the content of the reactive slipping agent in terms of the total amount is 1 to 12 parts by mass, preferably 3 to 10 parts by mass, further preferably 5 to 8 parts by mass based on 100 parts by mass of the thermosetting resin.

Also when the coating layer 1 forms the coating layer 1, the thermosetting resin, the curing accelerator, other additives and the thickness are as described above.

(Reactive Resin Beads)

The resin composition to be used for formation of the coating layer 1 may contain reactive resin beads as described above. When reactive resin beads are contained as described above, fine irregularities are formed on the surface of the coating layer 1 based on the shape of the reactive resin beads, so that excellent scratch resistance can be achieved. Since the reactive resin beads are chemically bonded to the thermosetting resin in the coating layer 1, they contribute to improvement of film strength of the coating layer 1, and are hard to fall off from the coating layer 1.

The reactive resin beads are resinous particles (filler) having a functional group that is reacted with and chemically bonded to the thermosetting resin.

The type of functional group of the reactive resin beads to be used in the present invention is appropriately determined according to the type of the thermosetting resin, and examples thereof include a hydroxyl group, a carboxyl group, an isocyanate group, a mercapto group, a hydrolyzable silyl group, an epoxy group, a polymerizable vinyl group and a (meth)acryloyl group. The number of functional groups per one reactive resin bead is not particularly limited, but it is preferred that one reactive resin bead has two or more functional groups for ensuring that reactive resin beads are stably retained in the adhesive layer to exhibit excellent moldability. More specifically, in the case of reactive resin beads having hydroxyl groups, the hydroxyl value is, for example, 1 to 100 KOH mg/g, preferably 5 to 80 KOH mg/g. In the case of reactive resin beads having isocyanate groups (—N=C=O), the N=C=O content is 1 to 10% by weight, preferably 3 to 8% by weight. In the case of reactive resin beads having functional groups other than the hydroxyl value and isocyanate groups, the functional group equivalent (a value obtained by dividing the molecular weight of the reactive resin beads by the molecular weight of the functional group) is 100 to 5000, preferably 150 to 3000.

The resin that forms particles of reactive resin beads is not particularly limited, and examples thereof include urethane resins, acrylic resins, urethane acrylic resins and nylon resins. Among them, urethane resins and acrylic resins are preferred.

As reactive resin beads according to the present invention, urethane beads having hydroxyl groups and/or isocyanate groups as functional groups, and acrylic beads having hydroxyl groups and/or isocyanate groups as functional groups are preferred for further improving moldability.

The refractive index of the reactive resin beads is not particularly limited, but it is, for example, 1.3 to 1.8, preferably 1.4 to 1.6 for imparting excellent transparency to the coating layer 1. Here, the refractive index of the reactive resin beads is a value that is measured in accordance with the method B in JIS K7142 "Plastics. Determination of refractive index." As the refractive index of the reactive resin beads is closer to that of the thermosetting resin to be used, it becomes harder to visually recognize the existence of reactive resin beads in the coating layer 1, so that further excellent transparency can be imparted to the coating layer 1.

The average particle size of reactive resin beads is not particularly limited, but it is, for example, 0.1 to 10 μm preferably 0.2 to 5 μm for further improving film strength and moldability. The average particle size of reactive resin beads is a value measured using Shimadzu Laser Diffraction-Type Particle-Size-Distribution Measuring Apparatus SALD-2100-WJA1 by a cyclone injection type dry measurement method in which a powder to be measured is injected from a nozzle by means of compressed air, dispersed in the air, and measured.

As these reactive resin beads, for example, Art-pearl C-TH series (hydroxyl group-added urethane beads) and Art-pearl RU to RV series (reactive urethane beads-Block NCO type) (all of which are manufactured by Negami Chemical Industrial Co., Ltd) are commercially available, and these commercial products can also be used.

These kinds of reactive resin beads may be used alone, or may be used in combination of two or more thereof.

The content of the reactive resin beads in the resin composition to be used for formation of the coating layer 1 is appropriately determined according to, for example, the type of thermosetting resin and the type of reactive resin beads to be used, and for example, the content of the reactive resin beads in terms of the total amount is 0.05 to 50 parts by mass, preferably 0.1 to 30 parts by mass, further preferably 0.3 to 15 parts by mass based on 100 parts by mass of the thermosetting resin. When the content of the reactive resin beads is 0.1 to 30 parts by mass, particularly 0.3 to 15 parts by mass based on 100 parts by mass of the thermosetting resin, the film strength of the coating layer 1 can be further improved to effectively suppress breakage of the coating layer 1.

[Base Material Layer 2]

In the battery packaging material according to the present invention, the base material layer 2 is a layer that forms the outermost layer. The material that forms the base material layer 2 is not particularly limited as long as it has insulation quality. Examples of the material that forms the base material layer 2 include polyesters, polyamides, epoxies, acrylics, fluororesins, polyurethanes, silicon resins, phenols, polyether imides, polyimides, and mixtures and copolymers thereof.

Specific examples of the polyester include polyethylene terephthalate, polybutylene terephthalate, polyethylene naphthalate, polybutylene naphthalate, polyethylene isophthalate, polycarbonate, copolymerization polyesters including ethylene terephthalate as a main repeating unit, and copolymerization polyesters including butylene terephthalate as a main repeating unit. Specific examples of the copolymerization polyester including ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene (terephthalate/sodium isophthalate), polyethylene (terephthalate/phenyl-dicarboxylate) and polyethylene(terephthalate/decane dicarboxylate). Specific examples of the copolymerization polyester including butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. A polyester has the advantage that it is excellent in electrolytic solution resistance, so that whitening etc. due to deposition of an electrolytic solution is hard to occur, and thus the polyester is suitably used as a material for formation of the base material layer 2.

Specific examples of the polyamide include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymetaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof. A stretched polyamide film is excellent in stretchability, can prevent occurrence of whitening due to resin breakage in the base material layer 2 during molding, and is thus suitably used as a material for formation of the base material layer 2.

The base material layer 2 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 2.

Among them, nylons and polyesters are preferred, and biaxially stretched nylons and biaxially stretched polyesters are further preferred, with biaxially stretched polyesters being especially preferred, as resin films for formation of the base material layer 2.

The base material layer 2 can also be a laminate with a resin film which is made of a different material for improving pinhole resistance, and insulation quality as a package of a battery. Specific examples include a multilayer structure in which a polyester film and a nylon film are laminated, and a multilayer structure in which a biaxially stretched polyester and a biaxially stretched nylon are laminated. When the base material layer 2 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method. When the resin films are bonded with the use of an adhesive, the composition of the adhesive to be used is not particularly limited, but resin compositions for adhesive layers as described later in the section of [Adhesive Layer 3] are preferred for, for example, shortening the curing time to reduce the lead time, and further, improving moldability.

The thickness of the base material layer 2 is, for example, 10 to 50 μm, preferably 15 to 30 μm.

[Adhesive Layer 3]

The adhesive layer 3 is a layer that is provided between the base material layer 2 and the barrier layer 4 for bonding these layers to each other.

The adhesive component to be used for formation of the adhesive layer 3 is not particularly limited as long as it is capable of bonding the base material layer 2 and the barrier layer 4 to each other, and it may be a two-pack type curable adhesive, or may be a one-pack type curable adhesive. Further, the bonding mechanism of the adhesive component to be used for formation of the adhesive layer 3 is not particularly limited, and may be any one of a chemical reaction type, a solvent volatilization type, a heat melting type and a heat pressing type. Examples thereof include polyester-based resins such as polyethylene terephthalate, polybutylene terephthalate, polyethylene naphthalate, polybutylene naphthalate, polyethylene isophthalate, polycarbonate and copolymerization polyesters; polyether-based adhesives; polyurethane-based adhesives; epoxy-based resins; phenol resin-based resins; polyamide-based resins such as nylon 6, nylon 66, nylon 12 and copolymerization polyamides; polyolefin-based resins such as polyolefins, carboxylic acid-modified polyolefins and metal-modified polyolefins; polyvinyl acetate-based resins; cellulose-based adhesives; (meth)acrylic resins; polyimide-based resins; amino resins such as urea resins and melamine resins; rubbers such as chloroprene rubber, nitrile rubber and styrene-butadiene rubber; and silicone-based resins.

In formation of the adhesive layer 3, resin compositions for adhesive layers, which contain a thermosetting resin, a curing accelerator and an elastomer resin, are preferably used for reducing the lead time by quickly curing the adhesive layer 3 without requiring aging under a high-temperature condition during production, and further, improving moldability. When a thermosetting resin and a curing accelerator are used in combination, the adhesive layer 3 is quickly cured without requiring aging under a high-temperature condition, so that the lead time can be reduced. When an elastomer resin is further incorporated, moderate flexibility is imparted to the adhesive layer 3 while shrinkage of the adhesive layer 3 during curing is suppressed, so that excellent moldability can be imparted to the battery packaging material.

The type of the thermosetting resin to be used in the resin composition for adhesive layers, the preferred thermosetting resin, and so on are the same as in the case of the thermosetting resin described above in the section of [Coating Layer 1].

The type of the curing accelerator to be used in the resin composition for adhesive layers, the preferred curing accelerator, and so on are the same as in the case of the curing accelerator described above in the section of [Coating Layer 1]. The content of the curing accelerator in the resin composition for adhesive layers is appropriately determined according to, for example, the type of thermosetting resin and the type of curing accelerator to be used, and for example, the content of the curing accelerator in terms of the total amount is 0.01 to 6 parts by mass, preferably 0.05 to 5 parts by mass, further preferably 0.1 to 2 parts by mass based on 100 parts by mass of the thermosetting resin.

The type of elastomer resin to be used in the resin composition for adhesive layers is not particularly limited, and examples thereof include polyolefin-based elastomers such as ethylene-based elastomers containing, as constituent monomers, ethylene and one or more a-olefins having 2 to 20 carbon atoms (excluding ethylene); styrene-based elastomers; polyester-based elastomers; urethane-based elastomers, acrylic elastomers; epoxy-based elastomers such as bisphenol A-type epoxy-based elastomers; polyol-based elastomers such as those of polyester polyols, polyester polyurethane polyols, polyether polyols and polyether polyurethane polyols; and rubber components such as nitrile rubber, fluororubber, acrylic rubber, silicone rubber, chloroprene rubber, isoprene rubber and butadiene rubber. These elastomer resins may be used alone, or may be used in combination of two or more thereof.

Among these elastomer resins, urethane-based elastomers, epoxy-based elastomers and polyol-based elastomers are preferred.

The content of the elastomer resin in the resin composition for adhesive layers is not particularly limited, and for example, the content of the elastomer resin in terms of the total amount is 3 to 50 parts by mass, preferably 5 to 30 parts by mass, further preferably 10 to 20 parts by mass based on 100 parts by mass of the thermosetting resin.

Further, the resin composition for adhesive layers may contain a light-absorbing and heat-generating substance as necessary. By incorporating a light-absorbing and heat-generating substance as described above, a stable and even amount of heat can be supplied to the whole of the resin composition for adhesive layers when photoirradiation is performed at the time of heating and quickly curing the resin composition for adhesive layers. Thus, occurrence of variations in cured state can be suppressed to form the adhesive layer 3 that is evenly cured.

The light-absorbing and heat-generating substance is a substance that generates heat by absorbing at least a part of light having a wavelength of about 300 to 2000 nm. The light-absorbing and heat-generating substance to be used in the present invention is not particularly limited, and examples thereof include metal powders, inorganic pigments, carbon and organic dyes.

Examples of the metal powder include metal powders of aluminum, stainless steel, iron, titanium, tungsten, nickel, and alloys thereof. These metal powders may be used alone, or may be used in combination of two or more thereof.

Specific examples of the inorganic pigment include zinc oxide, titanium oxide, barium sulfate, aluminum borate, potassium titanate, iridium oxide, tin oxide and composites thereof. These inorganic pigments have such a characteristic that heat is generated by absorbing far-infrared light, mid-infrared light and near-infrared light. These inorganic pigments may be used alone, or may be used in combination of two or more thereof.

Specific examples of the carbon include carbon black.

Specific examples of the organic dye include methine dyes, cyanine dyes, merocyanine dyes, mercurochrome dyes, xanthene-based dyes, porphyrin-based dyes, phthalocyanine dyes (copper phthalocyanine etc.), azo-based dyes and coumarin-based dyes. These organic dyes may be used alone, or may be used in combination of two or more thereof.

Among these light-absorbing and heat-generating substances, carbon and metal powders are preferred, and carbon black, titanium powders, aluminum powders, iron powders, tungsten powders, stainless steel powders and nickel powders are further preferred, with carbon black being still further preferred.

The average particle size of the light-absorbing and heat-generating substance is not particularly limited, and it is, for example, 1000 nm or less, preferably 10 to 1000 nm. Here, the average particle size of the light-absorbing and heat-generating substance means an average value when particles sizes of 1000 primary particles of the light-absorbing and heat-generating substance are measured using a transmission electron microscope.

When the light-absorbing and heat-generating substance is to be incorporated in the resin composition for adhesive layers, the content of the light-absorbing and heat-generating substance in terms of the total amount is, for example, 0.01 to 1 part by mass, preferably 0.05 to 0.7 parts by mass, further preferably 0.1 to 0.5 parts by mass based on 100 parts by mass of the thermosetting resin.

The adhesive layer 3 may contain a colorant. The colorant is not particularly limited, and a known pigment, dye or the like can be used.

The thickness of the adhesive layer 3 is, for example, 2 to 50 μm, preferably 3 to 25 μm.

[Barrier Layer 4]

In the battery packaging material according to the present invention, the barrier layer 4 is a layer which is intended to improve the strength of the packaging material, and also functions as a barrier layer for preventing ingress of water vapor, oxygen, light and the like into the battery. Specific examples of the material of the barrier layer 4 include metal foils such as those of aluminum, stainless steel and titanium; and films on which an inorganic compound such as silicon oxide or alumina is vapor-deposited. Among them, metal foils are preferred, and aluminum foils are further preferred. For preventing occurrence of creases and pinholes during production of the battery packaging material, it is preferred to use a soft aluminum foil, for example an annealed aluminum foil (JIS A8021P-O) or (JIS A8079P-O), for the barrier layer 4 in the present invention.

The thickness of the barrier layer 4 is not particularly limited, but for example, it is normally 10 to 200 μm, preferably 20 to 100 μm when a metal foil is used.

When a metal foil is to be used as the barrier layer 4, it is preferred that at least one surface, preferably at least a surface on the sealant layer side, further preferably both surfaces are subjected to a chemical conversion treatment for stabilization of bonding, prevention of dissolution and corrosion, and so on. Here, the chemical conversion treatment is a treatment for forming an acid resistant film on the surface of the barrier layer 4. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer formed of repeating units represented by the following general formulae (1) to (4).

[Chemical Formula 1]

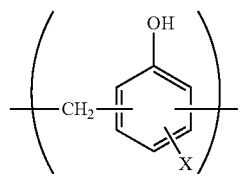

(1)

[Chemical Formula 2]

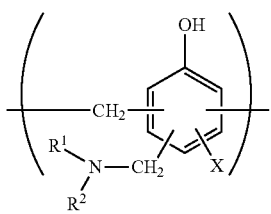

(2)

[Chemical Formula 3]

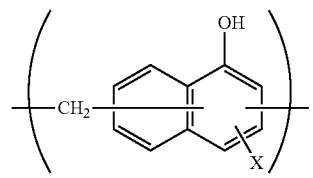

(3)

[Chemical Formula 4]

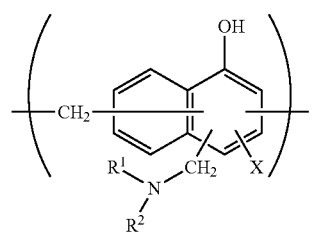

(4)

In the general formulae (1) to (4), X represents a hydrogen atom, a hydroxyl group, an alkyl group, a hydroxyalkyl group, an allyl group or a benzyl group. $R^{1'}$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups having 1 to 4 carbon atoms, such as a methyl group, an ethyl group, an n-propyl group, an isopropyl group, an n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 to about 1000000, preferably about 1000 to about 20000.

Examples of the chemical conversion treatment method for imparting corrosion resistance to the metal foil include a method in which the metal foil is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal foil. A resin layer with a cationic polymer crosslinked with a crosslinking agent may be formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by grafting a primary amine to an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

These chemical conversion treatments may be performed alone, or may be performed in combination of two or more thereof. The chemical conversion treatments may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistant film to be formed on the surface of the metal foil in the chemical conversion treatment is not particularly limited, but for example, when a chromate treatment is performed using a chromic acid compound, a phosphoric acid compound and the aminated phenol polymer in combination, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to about 200 mg, preferably about 5.0 mg to 150 mg, per 1 m$^2$ of the surface of the metal foil.

The chemical conversion treatment is performed in the following manner a solution containing a compound to be used for formation of an acid resistant film is applied to the surface of the metal foil by a bar coating method, a roll coating method, a gravure coating method, an immersion method or the like, and heating is then performed so that the temperature of the metal foil reaches about 70 to 200° C. The metal foil may be subjected to a degreasing treatment by an alkali immersion method, an electrolytic cleaning method, an acid cleaning method, an electrolytic acid cleaning method or the like before the barrier layer 4 is subjected to a chemical conversion treatment. When a degreasing treatment is performed as described above, the chemical conversion treatment of the surface of the metal foil can be further efficiently performed.

[Adhesive Layer 6]

In the battery packaging material according to the present invention, the adhesive layer 6 is a layer that is provided between the barrier layer 4 and the sealant layer 5 as necessary for strongly bonding the barrier layer 4 and the sealant layer 5 to each other.

The adhesive layer 6 is formed from an adhesive capable of bonding the barrier layer 4 and the sealant layer 5 to each other. The composition of the adhesive to be used for formation of the adhesive layer 6 is not particularly limited, but resin compositions for adhesive layers as described above in the section of [Adhesive Layer 3] are preferred for, for example, shortening the curing time to reduce the lead time, and further, improving moldability.

The thickness of the adhesive layer 6 is, for example, 1 to 40 μm, preferably 2 to 30 μm.

[Sealant Layer 5]

In the battery packaging material according to the present invention, the sealant layer 5 corresponds to the innermost layer, and during construction of a battery, the sealant layers are heat-welded to each other to hermetically seal the battery element.

The resin component to be used in the sealant layer 5 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylenes such as low-density polyethylene, medium-density polyethylene, high-density polyethylene and linear low-density polyethylene; crystalline or noncrystalline polypropylenes such as homopolypropylene, block copolymers of polypropylenes (e.g. block copolymers of propylene and ethylene) and random copolymers of polypropylenes (e.g. random copolymers of propylene and ethylene); terpolymers of ethylene-butene-propylene; and the like. Among these polyolefins, polyethylenes and polypropylenes are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer obtained by modifying the polyolefin with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, crystalline or noncrystalline polyolefins, cyclic polyolefins, and blend polymers thereof are preferred, and polyethylenes, polypropylenes, copolymers of ethylene and norbornene, and blend polymers of two or more thereof are further preferred.

The sealant layer 5 may be formed from one resin component alone, or may be formed from a blend polymer obtained by combining two or more resin components. Further, the sealant layer may be formed of only one layer, or may be formed of two or more layers with the same resin component or different resin components.

The thickness of the sealant layer 5 is not particularly limited, but it is 2 to 2000 μm, preferably 5 to 1000 μm, further preferably 10 to 500 μm.

3. Method for Producing Battery Packaging Material

While the method for producing a battery packaging material according to the present invention is not particularly limited as long as a laminate including layers each having a predetermined composition is obtained, and for example, the following method is shown as an example:

a method including: a first step of laminating the base material layer 2 and the barrier layer 4 with the adhesive layer 3 interposed therebetween to form a laminate (hereinafter, referred to as a "laminate A" in some cases) including the base material layer 2, the adhesive layer 3 and the barrier layer 4 laminated in this order; and a second step of laminating the sealant layer 5 on the barrier layer 4 of the laminate A obtained in the first step, wherein before the first step, after the first step and before the second step, or after the second step, a resin composition to be used for formation of the coating layer 1 is applied to a surface of the base material layer 2 on a side opposite to a surface thereof on which the adhesive layer 3 is laminated, and the resin composition is heated and cured.

Specifically, formation of the laminate A can be performed by a dry lamination method in which using a coating method such as an extrusion method, a gravure coating method or a roll coating method, an adhesive to be used for formation of the adhesive layer 3 is applied to the base material 1, or the barrier layer 4, the surface of which is subjected to a chemical conversion treatment as necessary, the resin composition is dried, the barrier layer 4 or the base material 1 is then laminated, and the adhesive layer 3 is cured.

For example, when the resin composition for adhesive layers is used as the adhesive layer 3, for example, the temperature is 150 to 200° C., preferably 160 to 190° C., and the time is 0.1 to 60 seconds, preferably 1 to 30 seconds as conditions for curing the adhesive layer 3. By using the resin composition for adhesive layers, the adhesive layer 3 can be sufficiently cured only with the above-mentioned curing conditions without requiring aging under a high-temperature condition for curing the adhesive layer 3, and therefore the lead time can be reduced.

Further, when the resin composition for adhesive layers, which further contains a light-absorbing and heat-generating substance, is used for the adhesive layer 3, a stable and even amount of heat can be supplied to the whole of the resin composition for adhesive layers by performing photoirradiation at the time of curing by heating. Thus, occurrence of variations in cured state can be suppressed to form the adhesive layer 3 that is evenly cured. For the photoirradiation, light having a wavelength at which the light-absorbing and heat-generating substance contained in the resin composition for adhesive layers can generate heat may be applied, and the photoirradiation conditions are appropriately determined based on the type and heat generation properties of the light-absorbing and heat-generating substance to be used. As one example of photoirradiation conditions, the output density of light at which the light-absorbing and heat-generating substance can generate heat is normally 1 to 10 $W \cdot m^{-2}$, preferably 3 to 9 $W \cdot m^{-2}$, further preferably 5 to 8 $W \cdot m^{-2}$. Photoirradiation is performed by applying light from the base material layer 2 side with a light source placed on the base material layer 2 side.

In the second step, the sealant layer 5 is laminated on the barrier layer 4 of the laminate A. When the sealant layer 5 is to be laminated directly on the barrier layer 4, a resin component that forms the sealant layer 5 may be applied onto the barrier layer 4 of the laminate A by a method such as a gravure coating method or a roll coating method. Examples of the method for providing the adhesive layer 6 between the barrier layer 4 and the sealant layer 5 include (1) a method in which the adhesive layer 6 and the sealant layer 5 are co-extruded to be laminated on the barrier layer 4 of the laminate A (coextrusion lamination method); (2) a method in which a laminate including the adhesive layer 6 and the sealant layer 5 is formed separately, and the laminate is laminated on the barrier layer 4 of the laminate A by a heat lamination method; (3) a method in which an adhesive for formation of the adhesive layer 6 is laminated on the barrier layer 4 of the laminate A by, for example, an extrusion method or a method in which the adhesive is applied by solution coating, dried at a high temperature, and further baked, and the sealant layer 5 formed into a sheet shape beforehand is laminated on the adhesive layer 6 by a thermal lamination method; and (4) a method in which the laminate A and the sealant layer 5 are bonded to each other with the adhesive layer 6 interposed therebetween while the melted adhesive layer 6 is poured between the barrier layer 4 of the laminate A and the sealant layer 5 formed into a sheet shape beforehand (sandwich lamination method).

Before the first step, after the first step and before the second step, or after the second step, a resin composition to be used for formation of the coating layer 1 is applied to a surface of the base material layer 2 on a side opposite to a surface thereof, on which the adhesive layer 3 is laminated, using a coating method such as a gravure coating method or a roll coating method, and the resin composition is heated and cured. For heating conditions for curing the coating layer 1, for example, the temperature is 150 to 200° C., preferably 160 to 190° C., and the time is 0.1 to 60 seconds, preferably 1 to 30 seconds. In the present invention, the coating layer 1 can be sufficiently cured only with the above-mentioned curing conditions without requiring aging under a high-temperature condition for curing the coating layer 1, and therefore the lead time can be considerably reduced as compared to conventional techniques.

In the manner described above, a laminate including the coating layer 1, the base material layer 2, the adhesive layer 3, the barrier layer 4, the surface of which is subjected to a chemical conversion treatment as necessary, the adhesive layer 6 provided as necessary, and the sealant layer 5 is formed.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Battery Packaging Material

The battery packaging material according to the present invention is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where sealant layers are in contact with each other) can be formed on the periphery of the battery element while a metal terminal connected to each of the positive electrode and the negative electrode protrudes to outside, and sealant layers at the flange portion are heat-sealed with each other to hermetically seal the battery element, thereby providing a battery using a battery packaging material. When the battery element is stored using the battery packaging material according to the present invention, the battery packaging material according to the present invention is used such that the sealant portion is on the inner side (surface in contact with the battery element).

The battery packaging material according to the present invention may be used for either a primary battery or a secondary battery, but is preferably used for a secondary battery. The type of secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The present invention will be described in detail below by showing examples and comparative examples. It is to be noted that the present invention is not particularly limited to examples.

Examples 1A to 32A and Comparative Examples 1A to 18A

[Production of Battery Packaging Material]

A barrier layer 4 formed of an aluminum foil (thickness: 40 μm) subjected to a chemical conversion treatment at both surfaces was laminated on a base material layer 2 formed of a biaxially stretched nylon film (thickness: 25 μm) using a dry lamination method. Specifically, a two-pack type urethane adhesive (a polyol compound and an aromatic isocyanate-based compound) was applied to one surface of the aluminum foil to form an adhesive layer 3 (thickness: 4 μm) on the barrier layer 4. The adhesive layer 3 on the barrier layer 4 and the base material layer 2 were then bonded to each other under pressure and heating, and an aging treatment was then performed at 40° C. for 24 hours to prepare a laminate of base material layer 2/adhesive layer 3/barrier layer 4. The chemical conversion treatment of the aluminum foil used as the barrier layer 4 was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher.

Each of the resin compositions shown in Tables 1A to 5A was applied to a surface (surface on a side opposite to the adhesive layer 3) of the base material layer 2, and the resin composition was cured under the following curing conditions to form a coating layer 1 on the surface of the base material layer 2.

Curing condition A: at 45° C. for 7 days

Curing condition B: at 170° C. for 60 seconds

Thereafter, carboxylic acid-modified polypropylene (disposed on the barrier layer side; thickness: 23 μm) and homopolypropylene (innermost layer; thickness: 23 μm) were co-extruded onto the barrier layer 4 of the laminate to laminate on the barrier layer 4 a sealant layer 5 including two layers. Thus, a battery packaging material including a laminate including the coating layer 1, the base material layer 2, the adhesive layer 3, the barrier layer 4 and the sealant layer 5 (carboxylic acid-modified polypropylene layer/homopolypropylene layer) in this order was obtained.

[Evaluation on Occurrence of Creases]

For each battery packaging material obtained as described above, whether creases occurred or not was visually checked, and the ratio of the number of samples in which creases occurred per 50 battery packaging materials (heat crease defect ratio: %) was calculated.

[Evaluation of Chemical Resistance]

Onto the coating layer of each battery packaging material obtained as described above, 0.5 ml of a chemical (electrolytic solution, ethanol, methyl ethyl ketone (MEK), ethyl acetate or toluene) was dropped, and the coating layer was covered with a watch glass. After the battery packaging material was left standing at room temperature for 3 hours, the chemical on the chemical-resistant coating layer was wiped off with gauze, the state of the surface of the coating layer of the battery packaging material was visually observed, and evaluation was performed based on the following criteria.

◯: No traces were observed on the surface.

x: Defects such as whitening, swelling and peeling were observed on the surface.

[Evaluation Results]

The obtained results are shown in Table 2A. From the results, it has been found that by using a resin composition containing a thermosetting resin and a curing accelerator for formation of a coating layer, the coating layer can be quickly cured, occurrence of creases caused by heat can be suppressed, and moreover, excellent chemical resistance is achieved (Examples 1A to 5A). On the other hand, when a curing accelerator was not used for formation of the coating layer, excellent chemical resistance was achieved in the case where the curing time was set long, and occurrence of creases caused by heat was suppressed in the case where the heating temperature was set high and the coating layer was quickly cured, but chemical resistance was insufficient (Comparative Example 1A).

It has been confirmed that similar results can be obtained even if main agents and curing agents of thermosetting resins and curing accelerators as used in the above-mentioned examples and comparative examples are replaced by other compounds having the same effects.

TABLE 1A

| | Resin composition used for formation of coating layer | | | | |
|---|---|---|---|---|---|
| | Thermosetting resin | | | Curing accelerator | |
| | Main agent | Curing agent | Content (parts by mass) | Type | Content (parts by mass) |
| Comparative Example 1A | Polyol compound | Isocyanate compound | 100 | — | — |
| Example 1A | Polyol compound | Isocyanate compound | 100 | Imidazole compound | 2 |
| Example 2A | Polyol compound | Isocyanate compound | 100 | DBU salt | 2 |
| Comparative Example 2A | Epoxy resin | Isocyanate compound | 100 | — | — |
| Example 3A | Epoxy resin | Isocyanate compound | 100 | Imidazole compound | 2 |
| Example 4A | Epoxy resin | Acid anhydride | 100 | DBU salt | 2 |
| Example 5A | Polyol compound | Acid anhydride | 100 | Sulfonium salt | 2 |

Polyol compound: cycloaliphatic polyol having a molecular weight of 500 to 20000 and a hydroxyl value of 50 to 210
Epoxy resin: phenol novolac-type epoxy resin having a molecular weight of 200 to 1000
Isocyanate compound: MDI (diphenylmethane diisocyanate) adduct
Acid anhydride: methylhexahydrophthalic anhydride
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.

TABLE 2A

|  | Curing condition | Heat crease defect ratio (%) | Chemical resistance | | | | |
|---|---|---|---|---|---|---|---|
|  |  |  | Electrolytic solution | Ethanol | MEK | Ethyl acetate | Toluene |
| Comparative Example 1A | Curing condition A | 20 | ○ | ○ | ○ | ○ | ○ |
| Example 1A | Curing condition B | 0 | X | X | X | X | X |
| Example 1A | Curing condition B | 0 | ○ | ○ | ○ | ○ | ○ |
| Example 2A | Curing condition B | 0 | ○ | ○ | ○ | ○ | ○ |
| Comparative Example 2A | Curing condition B | 0 | X | X | X | X | X |
| Example 3A | Curing condition B | 0 | ○ | ○ | ○ | ○ | ○ |
| Example 4A | Curing condition B | 0 | ○ | ○ | ○ | ○ | ○ |
| Example 5A | Curing condition B | 0 | ○ | ○ | ○ | ○ | ○ |

Examples 1B to 32B and Comparative Examples 1B to 18B (Case where a Resin for Forming a Coating Layer Contains a Slipping Agent)

[Production of Battery Packaging Material]

A barrier layer 4 formed of an aluminum foil (thickness: 40 μm) subjected to a chemical conversion treatment at both surfaces was laminated on a base material layer 2 formed of a biaxially stretched nylon film (thickness: 25 μm) using a dry lamination method. Specifically, a two-pack type urethane adhesive (a polyol compound and an aromatic isocyanate-based compound) was applied to one surface of the aluminum foil to form an adhesive layer 3 (thickness: 4 μm) on the barrier layer 4. The adhesive layer 3 on the barrier layer 4 and the base material layer 2 were then bonded to each other under pressure and heating, and an aging treatment was then performed at 40° C. for 24 hours to prepare a laminate of base material layer 2/adhesive layer 3/barrier layer 4. The chemical conversion treatment of the aluminum foil used as the barrier layer 4 was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher.

Each of the resin compositions shown in Tables 1B to 4B was applied to a surface (surface on a side opposite to the adhesive layer 3) of the base material layer 2, and the resin composition was cured under the following curing conditions to form a coating layer 1 on the surface of the base material layer 2.

Curing condition A: at 45° C. for 7 days
Curing condition B: at 170° C. for 60 seconds Thereafter, carboxylic acid-modified polypropylene (disposed on the barrier layer side; thickness: 23 μm) and homopolypropylene (innermost layer; thickness: 23 μm) were co-extruded onto the barrier layer 4 of the laminate to laminate on the barrier layer 4 a sealant layer 5 including two layers. Thus, a battery packaging material including a laminate including the coating layer 1, the base material layer 2, the adhesive layer 3, the barrier layer 4 and the sealant layer 5 (carboxylic acid-modified polypropylene layer/homopolypropylene layer) in this order was obtained.

TABLE 1B

| | Resin composition used for formation of coating layer | | | | | | |
|---|---|---|---|---|---|---|---|
| | Thermosetting resin | | | Curing accelerator | | Slipping agent | |
| | Main agent | Curing agent | Content (parts by mass) | Type | Content (parts by mass) | Type | Content (parts by mass) |
| Comparative Example 1B | Polyol compound | Isocyanate compound | 100 | — | — | Erucic acid amide | 1 |
| Comparative Example 2B | Polyol compound | Isocyanate compound | 100 | Imidazole compound | 2 | Erucic acid amide | 1 |
| Comparative Example 3B | Polyol compound | Isocyanate compound | 100 | DBU salt | 2 | Erucic acid amide | 1 |
| Comparative Example 4B | Epoxy resin | Acid anhydride | 100 | — | — | Erucic acid amide | 1 |
| Comparative Example 5B | Epoxy resin | Acid anhydride | 100 | Imidazole compound | 2 | Erucic acid amide | 1 |
| Comparative Example 6B | Epoxy resin | Acid anhydride | 100 | DBU salt | 2 | Erucic acid amide | 1 |

TABLE 1B-continued

| | Resin composition used for formation of coating layer | | | | | | |
|---|---|---|---|---|---|---|---|
| | Thermosetting resin | | | Curing accelerator | | Slipping agent | |
| | Main agent | Curing agent | Content (parts by mass) | Type | Content (parts by mass) | Type | Content (parts by mass) |
| Comparative Example 7B | Polyol compound | Amino resin | 100 | Sulfonium salt | 2 | Erucic acid amide | 1 |

Polyol compound: cycloaliphatic polyol having a molecular weight of 500 to 20000 and a hydroxyl value of 50 to 210
Epoxy resin: phenol novolac-type epoxy resin having a molecular weight of 200 to 1000
Isocyanate compound: MDI (diphenylmethane diisocyanate) adduct
Acid anhydride: methylhexahydrophthalic anhydride
Amino resin: benzoguanamine resin
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.

TABLE 2B

| | Resin composition used for formation of coating layer | | | | | | |
|---|---|---|---|---|---|---|---|
| | Thermosetting resin | | | Curing accelerator | | Slipping agent | |
| | Main agent | Curing agent | Content (parts by mass) | Type | Content (parts by mass) | Type | Content (parts by mass) |
| Comparative Example 8B | Polyol compound | Isocyanate compound | 100 | — | — | Terminal-silicon block polymer | 1 |
| Example 1B | Polyol compound | Isocyanate compound | 100 | Imidazole compound | 2 | Terminal-silicon block polymer | 1 |
| Example 2B | Polyol compound | Isocyanate compound | 100 | DBU salt | 2 | Terminal-silicon block polymer | 1 |
| Comparative Example 9B | Epoxy resin | Acid anhydride | 100 | — | — | Terminal-silicon block polymer | 1 |
| Example 2B | Epoxy resin | Acid anhydride | 100 | Imidazole compound | 2 | Terminal-silicon block polymer | 1 |
| Example 3B | Epoxy resin | Acid anhydride | 100 | DBU salt | 2 | Terminal-silicon block polymer | 1 |
| Example 4B | Polyol compound | Amino resin | 100 | Sulfonium salt | 2 | Terminal-silicon block polymer | 1 |

Polyol compound: cycloaliphatic polyol having a molecular weight of 500 to 20000 and a hydroxyl value of 50 to 210
Epoxy resin: phenol novolac-type epoxy resin having a molecular weight of 200 to 1000
Isocyanate compound: MDI (diphenylmethane diisocyanate) adduct
Acid anhydride: methylhexahydrophthalic anhydride
Amino resin: benzoguanamine resin
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.
Terminal-silicon block polymer: Trade name "MODIPER FS710" (manufactured by NOF CORPORATION); block copolymer with a (functional group-containing) compatible segment coupled at the end of a silicon segment

TABLE 3B

| | Resin composition used for formation of coating layer | | | | | | |
|---|---|---|---|---|---|---|---|
| | Thermosetting resin | | | Curing accelerator | | Slipping agent | |
| | Main agent | Curing agent | Content (parts by mass) | Type | Content (parts by mass) | Type | Content (parts by mass) |
| Comparative Example 10B | Polyol compound | Isocyanate compound | 100 | — | — | Terminal-fluorine block polymer | 1 |
| Example 5B | Polyol compound | Isocyanate compound | 100 | Imidazole compound | 2 | Terminal-fluorine block polymer | 1 |
| Example 6B | Polyol compound | Isocyanate compound | 100 | DBU salt | 2 | Terminal-fluorine block polymer | 1 |
| Comparative Example 11B | Epoxy resin | Acid anhydride | 100 | — | — | Terminal-fluorine block polymer | 1 |

TABLE 3B-continued

| | Resin composition used for formation of coating layer | | | | | | | |
|---|---|---|---|---|---|---|---|---|
| | Thermosetting resin | | | Curing accelerator | | Slipping agent | |
| | Main agent | Curing agent | Content (parts by mass) | Type | Content (parts by mass) | Type | Content (parts by mass) |
| Example 7B | Epoxy resin | Acid anhydride | 100 | Imidazole compound | 2 | Terminal-fluorine block polymer | 1 |
| Example 8B | Epoxy resin | Acid anhydride | 100 | DBU salt | 2 | Terminal-fluorine block polymer | 1 |
| Example 9B | Polyol compound | Amino resin | 100 | Sulfonium salt | 2 | Terminal-fluorine block polymer | 1 |

Polyol compound: cycloaliphatic polyol having a molecular weight of 500 to 20000 and a hydroxyl value of 50 to 210
Epoxy resin: phenol novolac-type epoxy resin having a molecular weight of 200 to 1000
Isocyanate compound: MDI (diphenylmethane diisocyanate) adduct
Acid anhydride: methylhexahydrophthalic anhydride
Amino resin: benzoguanamine resin
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.
Terminal-fluorine block polymer: Trade name "MODIPER F206" (manufactured by NOF CORPORATION); block copolymer with a (functional group-containing) compatible segment coupled at the end of a fluorine segment

TABLE 4B

| | Resin composition used for formation of coating layer | | | | | | |
|---|---|---|---|---|---|---|---|
| | Thermosetting resin | | | Curing accelerator | | Slipping agent | |
| | Main agent | Curing agent | Content (parts by mass) | Type | Content (parts by mass) | Type | Content (parts by mass) |
| Comparative Example 12B | Polyol compound | Isocyanate compound | 100 | — | — | Silicone-modified acrylic resin | 1 |
| Example 10B | Polyol compound | Isocyanate compound | 100 | Imidazole compound | 2 | Silicone-modified acrylic resin | 1 |
| Example 11B | Polyol compound | Isocyanate compound | 100 | DBU salt | 2 | Silicone-modified acrylic resin | 1 |
| Comparative Example 13B | Epoxy resin | Acid anhydride | 100 | — | — | Silicone-modified acrylic resin | 1 |
| Example 12B | Epoxy resin | Acid anhydride | 100 | Imidazole compound | 2 | Silicone-modified acrylic resin | 1 |
| Example 13B | Epoxy resin | Acid anhydride | 100 | DBU salt | 2 | Silicone-modified acrylic resin | 1 |
| Example 14B | Polyol compound | Amino resin | 100 | Sulfonium salt | 2 | Silicone-modified acrylic resin | 1 |

Polyol compound: cycloaliphatic polyol having a molecular weight of 500 to 20000 and a hydroxyl value of 50 to 210
Epoxy resin: phenol novolac-type epoxy resin having a molecular weight of 200 to 1000
Isocyanate compound: MDI (diphenylmethane diisocyanate) adduct
Acid anhydride: methylhexahydrophthalic anhydride
Amino resin: benzoguanamine resin
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.
Silicone-modified acrylic resin: trade name "SYMAC US270" (manufactured by NOF CORPORATION); silicone-modified acrylic resin with silicone graft-polymerized with an acrylic resin containing a functional group

[Evaluation on Occurrence of Creases]

For each battery packaging material obtained as described above, whether creases occurred or not was visually checked, and the ratio of the number of samples in which creases occurred per 50 battery packaging materials (heat crease defect ratio: %) was calculated.

[Evaluation of White Powder Defect Ratio]

Each battery packaging material obtained as described above was stored at normal temperature and normal humidity for 1 week after production, the coating layer was then visually observed, and the ratio of the number of samples in which the slipping agent was bled out to cause white powder (powdering) per 50 battery packaging materials (white powder defect ratio: %) was calculated.

[Dynamic Friction Coefficient (Time-Dependent Change)]

Each battery packaging material obtained as described above was stored in the form of a roll in a constant temperature and constant humidity bath (40° C., 90% RH) for 3 months, and the dynamic friction coefficient of the coating layer of each battery packaging material was measured 1 day, 3 weeks and 3 months after storage. The measurement was performed at a friction velocity of 100 mm/minute under a load of 100 g using a HEIDON TYPE measurement apparatus [manufactured by Toshinkagaku: HEIDON 14 (trade name)], and the dynamic friction coefficient was evaluated in accordance with the following assessment criteria.

<Assessment Criteria for Dynamic Friction Coefficient>

◯: The dynamic friction coefficient is less than 0.15.

Δ: The dynamic friction coefficient is not less than 0.15 and less than 0.3.

x: The dynamic friction coefficient is more than 0.3.

[Dynamic Friction Coefficient (Temperature-Dependent Change)]

Each battery packaging material obtained as described above was left standing in an atmosphere at each of temperatures of 25° C., 40° C. and 55° C. for 24 hours, and the dynamic friction coefficient of the coating layer of the battery packaging material was then measured in the atmosphere at each temperature. The measurement was performed at a friction velocity of 100 mm/minute under a load of 100 g using a HEIDON TYPE measurement apparatus [manufactured by Toshinkagaku: HEIDON 14 (trade name)], and the dynamic friction coefficient was evaluated in accordance with the same assessment criteria as in the case of [Dynamic Friction Coefficient (Time-Dependent Change)].

[Evaluation Results]

The obtained results are shown in Tables 5B and 6B. From the results, it has been found that by using a resin composition containing a thermosetting resin, a curing accelerator and a reactive slipping agent for formation of a coating layer, the coating layer can be quickly cured, occurrence of creases caused by heat can be suppressed, and moreover, the dynamic friction coefficient does not increase due to elapse of time or exposure to a high-temperature atmosphere, so that deterioration of the slipping effect can be suppressed (Examples 1B to 14B). On the other hand, when a non-reactive slipping agent (fatty acid amide) was used in place of a reactive slipping agent in formation of the coating layer, the white powder defect ratio was high, the slipping agent was bled out, and after storage of the slipping agent for 3 months, or under the temperature condition of 55° C., the dynamic friction coefficient was increased, so that the slipping effect of the coating layer was deteriorated (Comparative Examples 1B to 7B). Even when a reactive slipping agent was used in formation of the coating layer, the dynamic friction coefficient was high, and thus a sufficient slipping effect was not achieved when a curing accelerator was not contained (Comparative Examples 8B to 13B).

It has been confirmed that similar results can be obtained even if main agents and curing agents of thermosetting resins and curing accelerators as used in the above-mentioned examples and comparative examples are replaced by other compounds having the same effects.

TABLE 5B

|  | Curing condition | Heat crease defect ratio (%) | White powder defect ratio (%) | Dynamic friction coefficient (time-dependent change) | | | Dynamic friction coefficient (temperature-dependent change) | | |
|---|---|---|---|---|---|---|---|---|---|
|  |  |  |  | After 1 day | After 3 weeks | After 3 months | 25° C. | 40° C. | 55° C. |
| Comparative Example 1B | Curing condition A | 20 | 15 | ○ | Δ | X | ○ | Δ | X |
|  | Curing condition B | 0 | 15 | X | X | X | X | X | X |
| Comparative Example 2B | Curing condition B | 0 | 15 | ○ | Δ | X | ○ | Δ | X |
| Comparative Example 3B | Curing condition B | 0 | 15 | ○ | Δ | X | ○ | Δ | X |
| Comparative Example 4B | Curing condition B | 0 | 15 | X | X | X | X | X | X |
| Comparative Example 5B | Curing condition B | 0 | 15 | ○ | Δ | X | ○ | Δ | X |
| Comparative Example 6B | Curing condition B | 0 | 15 | ○ | Δ | X | ○ | Δ | X |
| Comparative Example 8B | Curing condition B | 0 | 0 | X | X | X | X | X | X |
| Example 1B | Curing condition B | 0 | 0 | ○ | ○ | ○ | ○ | ○ | ○ |
| Example 2B | Curing condition B | 0 | 0 | ○ | ○ | ○ | ○ | ○ | ○ |
| Comparative Example 9B | Curing condition B | 0 | 0 | X | X | X | X | X | X |
| Example 2B | Curing condition B | 0 | 0 | ○ | ○ | ○ | ○ | ○ | ○ |
| Example 3B | Curing condition B | 0 | 0 | ○ | ○ | ○ | ○ | ○ | ○ |
| Example 4B | Curing condition B | 0 | 0 | ○ | ○ | ○ | ○ | ○ | ○ |

TABLE 6B

| | Curing condition | Heat crease defect ratio (%) | White powder defect ratio (%) | Dynamic friction coefficient (time-dependent change) | | | Dynamic friction coefficient (temperature-dependent change) | | |
|---|---|---|---|---|---|---|---|---|---|
| | | | | After 1 day | After 3 weeks | After 3 months | 25° C. | 40° C. | 55° C. |
| Comparative Example 10B | Curing condition B | 0 | 0 | X | X | X | X | X | X |
| Example 5B | Curing condition B | 0 | 0 | ○ | ○ | ○ | ○ | ○ | ○ |
| Example 6B | Curing condition B | 0 | 0 | ○ | ○ | ○ | ○ | ○ | ○ |
| Comparative Example 11B | Curing condition B | 0 | 0 | X | X | X | X | X | X |
| Example 7B | Curing condition B | 0 | 0 | ○ | ○ | ○ | ○ | ○ | ○ |
| Example 8B | Curing condition B | 0 | 0 | ○ | ○ | ○ | ○ | ○ | ○ |
| Example 9B | Curing condition B | 0 | 0 | ○ | ○ | ○ | ○ | ○ | ○ |
| Comparative Example 12B | Curing condition B | 0 | 0 | ○ | ○ | ○ | ○ | ○ | ○ |
| Example 10B | Curing condition B | 0 | 0 | ○ | ○ | ○ | ○ | ○ | ○ |
| Example 11B | Curing condition B | 0 | 0 | X | X | X | X | X | X |
| Comparative Example 13B | Curing condition B | 0 | 0 | ○ | ○ | ○ | ○ | ○ | ○ |
| Example 12B | Curing condition B | 0 | 0 | ○ | ○ | ○ | ○ | ○ | ○ |
| Example 13B | Curing condition B | 0 | 0 | ○ | ○ | ○ | ○ | ○ | ○ |
| Example 14B | Curing condition B | 0 | 0 | ○ | ○ | ○ | ○ | ○ | ○ |

Examples 1C to 68C and Comparative Examples 1 to 3C (Case where a Resin for Forming a Coating Layer Contains Reactive Resin Beads)

[Production of Battery Packaging Material 1C]

A barrier layer formed of an aluminum foil (thickness: 40 μm) subjected to a chemical conversion treatment at both surfaces was laminated on a base material layer formed of a biaxially stretched nylon film (thickness: 25 μm) using a dry lamination method. Specifically, a two-pack type urethane adhesive (a polyol compound and an aromatic isocyanate-based compound) was applied to one surface of the aluminum foil to form an adhesive layer (thickness: 4 μm) on the barrier layer. The adhesive layer on the barrier layer and the base material layer were then bonded to each other under pressure and heating, and an aging treatment was then performed at 40° C. for 24 hours to prepare a laminate of base material layer/adhesive layer/barrier layer. The chemical conversion treatment of the aluminum foil used as the barrier layer was performed by applying to both the surfaces of the aluminum foil a treatment liquid including a phenol resin, a chromium fluoride compound and phosphoric acid using a roll coating method in such a manner that the application amount of chromium was 10 mg/m² (dry weight), and performing baking for 20 seconds under such conditions that the film temperature was 180° C. or higher.

Each of the resin compositions A having a composition as described below was applied to a surface (surface on a side opposite to the adhesive layer) of the base material layer, and the resin composition was cured at 80° C. for 7 days to form a coating layer on the surface of the base material layer 2.

Thereafter, carboxylic acid-modified polypropylene (disposed on the barrier layer side; thickness: 23 μm) and homopolypropylene (innermost layer; thickness: 23 μm) were co-extruded onto the barrier layer of the laminate to laminate on the barrier layer 4 a sealant layer 5 including two layers. Thus, a battery packaging material including a laminate including the coating layer, the base material layer, the adhesive layer, the barrier layer and the sealant layer (carboxylic acid-modified polypropylene layer/homopolypropylene layer) in this order was obtained.

| <Resin Composition A Used for Formation of Coating Layer> | |
|---|---|
| Thermosetting resin (main agent: urethane polyol, curing agent: diphenylmethane diisocyanate) | 100 parts by mass |
| Resin beads (resin beads shown in Tables 1C to 6C) | predetermined amount shown in Tables 1C to 6C |

[Production of Battery Packaging Material 2C]

Except that in formation of the coating layer, a resin composition B having a composition as described below was used, and the conditions for curing the resin composition were changed to a temperature of 160° C. and a time of 30 seconds, the same method as described in [Production of Battery Packaging Material 1C] was carried out to produce a battery packaging material.

| <Resin Composition B Used for Formation of Coating Layer> | |
|---|---|
| Thermosetting resin (main agent: urethane polyol, curing agent: diphenylmethane diisocyanate) | 100 parts by mass |
| Curing accelerator (imidazole compound that accelerates the crosslinking reaction of the thermosetting resin at 80 to 150° C.) | 1 part by mass |
| Resin beads (resin beads shown in Tables 1C to 6C) | predetermined amount shown in Tables 1C to 6C |

[Production of Battery Packaging Material 3C]

Except that in formation of the coating layer, a resin composition C having a composition as described below was used, and the conditions for curing the resin composition were changed to a temperature of 160° C. and a time of 30 seconds, the same method as described in [Production of Battery Packaging Material 1C] was carried out to produce a battery packaging material.

| <Resin Composition C Used for Formation of Coating Layer> | |
|---|---|
| Thermosetting resin (main agent: urethane polyol, curing agent: diphenylmethane diisocyanate) | 100 parts by mass |
| Curing accelerator (octylic acid salt of 1,8-diazabicyclo[5.4.0]undec-7-ene) | 1 part by mass |
| Resin beads (resin beads shown in Tables 1C to 6C) | predetermined amount shown in Tables 1C to 6C |

[Evaluation of Scratch Resistance]

For each battery packaging material obtained as described above, a scratch resistance test was conducted using a Gakushin type abrasion tester. Specifically, using a Gakushin type abrasion tester, the coating layer of each battery packaging material was subjected to a friction treatment with a friction block covered with fine quality paper with the load set to 500 g, the reciprocation number set to 200 and the reciprocation speed set to 30±2 times/minute. After completion of the friction treatment, the surface of the battery packaging material was visually observed, and scratch resistance was evaluated in accordance with the following assessment criteria.

(Assessment Criteria for Scratch Resistance)

⊙: Scratches (cracks, detachment of the coating layer, and so on) were not observed at all.

○: Slight scratches (cracks, detachment of the coating layer, and so on) were observed.

x: Marked scratches (cracks, detachment of the coating layer, and so on) were observed.

[Evaluation of Maintenance Performance of Chemical Resistance]

Maintenance performance of chemical resistance was evaluated using each battery packaging material after the scratch resistance test. Specifically, after the scratch resistance test, 0.5 ml of a chemical (electrolytic solution, ethanol, methyl ethyl ketone (MEK), ethyl acetate or toluene) was dropped onto the coating layer of each battery packaging material abraded with the friction block, and the coating layer was covered with a watch glass. After the battery packaging material was left standing at room temperature for 3 hours, the chemical on the chemical-resistant coating layer was wiped off with gauze, the state of the surface of the coating layer of the battery packaging material was visually observed, and evaluation was performed based on the following criteria.

(Assessment Criteria for Maintenance Performance of Chemical Resistance)

⊙: No traces were observed on the surface for any of the chemicals.

Δ: Defects such as whitening, swelling and peeling were observed on the surface for at least one of the chemicals, but no traces were observed on the surface for some of the chemicals.

x: Defects such as whitening, swelling and peeling were observed on the surface for all the chemicals.

[Evaluation of Film Strength of Coating Layer]

The coating layer of each battery packaging material obtained as described above was visually observed for presence/absence of breakage of the resin, and the film strength of the coating layer was evaluated in accordance with the following criteria.

(Assessment Criteria for Film Strength of Coating Layer)

⊙ Breakage of the resin is not observed in the coating layer.

x: Breakage of the resin is observed in the coating layer.

[Evaluation Results]

The obtained results are shown in Tables 1C to 6C. As is evident from Tables 1C to 6C, the coating layer did not have scratch resistance, and had reduced resistance to friction when resin beads were not blended in the coating layer (Comparative Example 1C), and when resin beads having no reactivity were added to the coating layer (Comparative Examples 2C to 5C). Further, when resin beads having no reactivity were added to the coating layer (Comparative Examples 2C to 5C), cracking or falling occurred in the coating layer through the scratch resistance test, and the coating layer had very poor chemical resistance after the scratch resistance test. On the other hand, when reactive resin beads were added to the coating layer, the coating layer had excellent scratch resistance, so that excellent chemical resistance was maintained after the scratch resistance test. When reactive resin beads were added in an amount of 0.1 to 50 parts by mass based on 100 parts by mass of the thermosetting resin in the coating layer, excellent film strength was also achieved. When a curing accelerator was added to the resin composition for forming the coating layer, the adhesive layer was cured in an extremely short time of 30 seconds at 160° C., so that the lead time was considerably reduced (the case of resin compositions B and C).

TABLE 1C

| | | Type and added amount of resin beads used | | | | Scratch resistance Resin composition used for formation of coating layer | | |
|---|---|---|---|---|---|---|---|---|
| | Type of | | Number of bonded functional groups | Average particle | Added amount | | | |
| | Constituent resin of beads | functional group | (hydroxyl value, KOH mg/g) | size (μm) | (parts by mass) | Resin composition A | Resin composition B | Resin composition C |
| Comparative Example 1C | | No resin beads | | | | X | X | X |

TABLE 1C-continued

| | | | | | | Resin composition A | Resin composition B | Resin composition C |
|---|---|---|---|---|---|---|---|---|
| Comparative Example 2C | Urethane | None | — | 3 | 0.3 | X | X | X |
| Comparative Example 3C | Urethane | None | — | 3 | 15 | X | X | X |
| Example 1C | Urethane | Hydroxyl group | 1 | 3 | 0.3 | ⊙ | ⊙ | ⊙ |
| Example 2C | Urethane | Hydroxyl group | 1 | 3 | 15 | ⊙ | ⊙ | ⊙ |
| Example 3C | Urethane | Hydroxyl group | 5 | 1 | 0.1 | ⊙ | ⊙ | ⊙ |
| Example 4C | Urethane | Hydroxyl group | 5 | 1 | 0.3 | ⊙ | ⊙ | ⊙ |
| Example 5C | Urethane | Hydroxyl group | 5 | 1 | 15 | ⊙ | ⊙ | ⊙ |
| Example 6C | Urethane | Hydroxyl group | 5 | 1 | 30 | ⊙ | ⊙ | ⊙ |
| Example 7C | Urethane | Hydroxyl group | 5 | 1 | 50 | ⊙ | ⊙ | ⊙ |
| Example 8C | Urethane | Hydroxyl group | 5 | 2 | 0.1 | ⊙ | ⊙ | ⊙ |
| Example 9C | Urethane | Hydroxyl group | 5 | 2 | 0.3 | ⊙ | ⊙ | ⊙ |
| Example 10C | Urethane | Hydroxyl group | 5 | 2 | 15 | ⊙ | ⊙ | ⊙ |
| Example 11C | Urethane | Hydroxyl group | 5 | 2 | 30 | ⊙ | ⊙ | ⊙ |
| Example 12C | Urethane | Hydroxyl group | 5 | 2 | 50 | ⊙ | ⊙ | ⊙ |

| | Maintenance performance of chemical resistance Resin composition used for formation of coating layer | | | Film strength of coating layer Resin composition used for formation of coating layer | | |
|---|---|---|---|---|---|---|
| | Resin composition A | Resin composition B | Resin composition C | Resin composition A | Resin composition B | Resin composition C |
| Comparative Example 1C | ⊙ | ⊙ | ⊙ | ⊙ | ⊙ | ⊙ |
| Comparative Example 2C | X | X | X | ⊙ | ⊙ | ⊙ |
| Comparative Example 3C | X | X | X | ⊙ | ⊙ | ⊙ |
| Example 1C | ⊙ | ⊙ | ⊙ | ⊙ | ⊙ | ⊙ |
| Example 2C | ⊙ | ⊙ | ⊙ | ⊙ | ⊙ | ⊙ |
| Example 3C | ⊙ | ⊙ | ⊙ | ⊙ | ⊙ | ⊙ |
| Example 4C | ⊙ | ⊙ | ⊙ | ⊙ | ⊙ | ⊙ |
| Example 5C | ⊙ | ⊙ | ⊙ | ⊙ | ⊙ | ⊙ |
| Example 6C | ⊙ | ⊙ | ⊙ | ⊙ | ⊙ | ⊙ |
| Example 7C | ⊙ | ⊙ | ⊙ | X | X | X |
| Example 8C | ⊙ | ⊙ | ⊙ | ⊙ | ⊙ | ⊙ |
| Example 9C | ⊙ | ⊙ | ⊙ | ⊙ | ⊙ | ⊙ |
| Example 10C | ⊙ | ⊙ | ⊙ | ⊙ | ⊙ | ⊙ |
| Example 11C | ⊙ | ⊙ | ⊙ | ⊙ | ⊙ | ⊙ |
| Example 12C | ⊙ | ⊙ | ⊙ | ⊙ | ⊙ | ⊙ |

All of the resin beads made of urethane resin, which are shown in the table, have a refractive index of 1.5.

TABLE 2C

| | Type and added amount of resin beads used | | | | | Scratch resistance Resin composition used for formation of coating layer | | |
|---|---|---|---|---|---|---|---|---|
| | Constituent resin of beads | Type of functional group | Number of bonded functional groups (hydroxyl value, KOH mg/g) | Average particle size (μm) | Added amount (parts by mass) | Resin composition A | Resin composition B | Resin composition C |
| Example 13C | Urethane | Hydroxyl group | 5 | 5 | 0.1 | ⊙ | ⊙ | ⊙ |
| Example 14C | Urethane | Hydroxyl group | 5 | 5 | 0.3 | ⊙ | ⊙ | ⊙ |
| Example 15C | Urethane | Hydroxyl group | 5 | 5 | 15 | ⊙ | ⊙ | ⊙ |
| Example 16C | Urethane | Hydroxyl group | 5 | 5 | 30 | ⊙ | ⊙ | ⊙ |
| Example 17C | Urethane | Hydroxyl group | 5 | 5 | 50 | ⊙ | ⊙ | ⊙ |
| Example 18C | Urethane | Hydroxyl group | 5 | 10 | 0.1 | ⊙ | ⊙ | ⊙ |
| Example 19C | Urethane | Hydroxyl group | 5 | 10 | 0.3 | ⊙ | ⊙ | ⊙ |
| Example 20C | Urethane | Hydroxyl group | 5 | 10 | 15 | ⊙ | ⊙ | ⊙ |
| Example 21C | Urethane | Hydroxyl group | 5 | 10 | 30 | ⊙ | ⊙ | ⊙ |
| Example 22C | Urethane | Hydroxyl group | 5 | 10 | 50 | ⊙ | ⊙ | ⊙ |
| Example 23C | Urethane | Hydroxyl group | 80 | 3 | 0.3 | ⊙ | ⊙ | ⊙ |
| Example 24C | Urethane | Hydroxyl group | 80 | 3 | 15 | ⊙ | ⊙ | ⊙ |
| Example 25C | Urethane | Hydroxyl group | 100 | 3 | 0.3 | ⊙ | ⊙ | ⊙ |
| Example 26C | Urethane | Hydroxyl group | 100 | 3 | 15 | ⊙ | ⊙ | ⊙ |

TABLE 2C-continued

| | | Maintenance performance of chemical resistance Resin composition used for formation of coating layer | | | Film strength of coating layer Resin composition used for formation of coating layer | | |
|---|---|---|---|---|---|---|---|
| | | Resin composition A | Resin composition B | Resin composition C | Resin composition A | Resin composition B | Resin composition C |
| | Example 13C | ⊙ | ⊙ | ⊙ | ⊙ | ⊙ | ⊙ |
| | Example 14C | ⊙ | ⊙ | ⊙ | ⊙ | ⊙ | ⊙ |
| | Example 15C | ⊙ | ⊙ | ⊙ | ⊙ | ⊙ | ⊙ |
| | Example 16C | ⊙ | ⊙ | ⊙ | ⊙ | ⊙ | ⊙ |
| | Example 17C | ⊙ | ⊙ | ⊙ | ⊙ | ⊙ | ⊙ |
| | Example 18C | ⊙ | ⊙ | ⊙ | ⊙ | ⊙ | ⊙ |
| | Example 19C | ⊙ | ⊙ | ⊙ | ⊙ | ⊙ | ⊙ |
| | Example 20C | ⊙ | ⊙ | ⊙ | ⊙ | ⊙ | ⊙ |
| | Example 21C | ⊙ | ⊙ | ⊙ | ⊙ | ⊙ | ⊙ |
| | Example 22C | ⊙ | ⊙ | ⊙ | X | X | X |
| | Example 23C | ⊙ | ⊙ | ⊙ | ⊙ | ⊙ | ⊙ |
| | Example 24C | ⊙ | ⊙ | ⊙ | ⊙ | ⊙ | ⊙ |
| | Example 25C | ⊙ | ⊙ | ⊙ | ⊙ | ⊙ | ⊙ |
| | Example 26C | ⊙ | ⊙ | ⊙ | ⊙ | ⊙ | ⊙ |

All of the resin beads made of urethane resin, which are shown in the table, have a refractive index of 1.5.

TABLE 3C

| | Type and added amount of resin beads used | | | | | Scratch resistance Resin composition used for formation of coating layer | | |
|---|---|---|---|---|---|---|---|---|
| | Constituent resin of beads | Type of functional group | Number of bonded functional groups (content of NCO in resin beads, % by weight) | Average particle size (μm) | Added amount (parts by mass) | Resin composition A | Resin composition B | Resin composition C |
| Example 27C | Urethane | NCO group | 1 | 3 | 0.3 | ⊙ | ⊙ | ⊙ |
| Example 28C | Urethane | NCO group | 1 | 3 | 15 | ⊙ | ⊙ | ⊙ |
| Example 29C | Urethane | NCO group | 3 | 1 | 0.1 | ⊙ | ⊙ | ⊙ |
| Example 30C | Urethane | NCO group | 3 | 1 | 0.3 | ⊙ | ⊙ | ⊙ |
| Example 31C | Urethane | NCO group | 3 | 1 | 15 | ⊙ | ⊙ | ⊙ |
| Example 32C | Urethane | NCO group | 3 | 1 | 30 | ⊙ | ⊙ | ⊙ |
| Example 33C | Urethane | NCO group | 3 | 1 | 50 | ⊙ | ⊙ | ⊙ |
| Example 34C | Urethane | NCO group | 3 | 2 | 0.1 | ⊙ | ⊙ | ⊙ |
| Example 35C | Urethane | NCO group | 3 | 2 | 0.3 | ⊙ | ⊙ | ⊙ |
| Example 36C | Urethane | NCO group | 3 | 2 | 15 | ⊙ | ⊙ | ⊙ |
| Example 37C | Urethane | NCO group | 3 | 2 | 30 | ⊙ | ⊙ | ⊙ |
| Example 38C | Urethane | NCO group | 3 | 2 | 50 | ⊙ | ⊙ | ⊙ |
| Example 39C | Urethane | NCO group | 3 | 5 | 0.1 | ⊙ | ⊙ | ⊙ |
| Example 40C | Urethane | NCO group | 3 | 5 | 0.3 | ⊙ | ⊙ | ⊙ |
| Example 41C | Urethane | NCO group | 3 | 5 | 15 | ⊙ | ⊙ | ⊙ |
| Example 42C | Urethane | NCO group | 3 | 5 | 30 | ⊙ | ⊙ | ⊙ |
| Example 43C | Urethane | NCO group | 3 | 5 | 50 | ⊙ | ⊙ | ⊙ |

| | | Maintenance performance of chemical resistance Resin composition used for formation of coating layer | | | Film strength of coating layer Resin composition used for formation of coating layer | | |
|---|---|---|---|---|---|---|---|
| | | Resin composition A | Resin composition B | Resin composition C | Resin composition A | Resin composition B | Resin composition C |
| | Example 27C | ⊙ | ⊙ | ⊙ | ⊙ | ⊙ | ⊙ |
| | Example 28C | ⊙ | ⊙ | ⊙ | ⊙ | ⊙ | ⊙ |
| | Example 29C | ⊙ | ⊙ | ⊙ | ⊙ | ⊙ | ⊙ |
| | Example 30C | ⊙ | ⊙ | ⊙ | ⊙ | ⊙ | ⊙ |
| | Example 31C | ⊙ | ⊙ | ⊙ | ⊙ | ⊙ | ⊙ |
| | Example 32C | ⊙ | ⊙ | ⊙ | ⊙ | ⊙ | ⊙ |
| | Example 33C | ⊙ | ⊙ | ⊙ | X | X | X |
| | Example 34C | ⊙ | ⊙ | ⊙ | ⊙ | ⊙ | ⊙ |
| | Example 35C | ⊙ | ⊙ | ⊙ | ⊙ | ⊙ | ⊙ |
| | Example 36C | ⊙ | ⊙ | ⊙ | ⊙ | ⊙ | ⊙ |
| | Example 37C | ⊙ | ⊙ | ⊙ | ⊙ | ⊙ | ⊙ |

TABLE 3C-continued

| | | | | | | |
|---|---|---|---|---|---|---|
| Example 38C | ⊙ | ⊙ | ⊙ | X | X | X |
| Example 39C | ⊙ | ⊙ | ⊙ | ⊙ | ⊙ | ⊙ |
| Example 40C | ⊙ | ⊙ | ⊙ | ⊙ | ⊙ | ⊙ |
| Example 41C | ⊙ | ⊙ | ⊙ | ⊙ | ⊙ | ⊙ |
| Example 42C | ⊙ | ⊙ | ⊙ | ⊙ | ⊙ | ⊙ |
| Example 43C | ⊙ | ⊙ | ⊙ | X | X | X |

All of the resin beads made of urethane resin, which are shown in the table, have a refractive index of 1.5.

TABLE 4C

| | Type and added amount of resin beads used | | | | | Scratch resistance Resin composition used for formation of coating layer | | |
|---|---|---|---|---|---|---|---|---|
| | Constituent resin of beads | Type of functional group | Number of bonded functional groups (content of NCO in resin beads, % by weight) | Average particle size (μm) | Added amount (parts by mass) | Resin composition A | Resin composition B | Resin composition C |
| Example 44C | Urethane | NCO group | 3 | 10 | 0.1 | ⊙ | ⊙ | ⊙ |
| Example 45C | Urethane | NCO group | 3 | 10 | 0.3 | ⊙ | ⊙ | ⊙ |
| Example 46C | Urethane | NCO group | 3 | 10 | 15 | ⊙ | ⊙ | ⊙ |
| Example 47C | Urethane | NCO group | 3 | 10 | 30 | ⊙ | ⊙ | ⊙ |
| Example 48C | Urethane | NCO group | 3 | 10 | 50 | ⊙ | ⊙ | ⊙ |
| Example 49C | Urethane | NCO group | 8 | 3 | 0.3 | ⊙ | ⊙ | ⊙ |
| Example 50C | Urethane | NCO group | 8 | 3 | 15 | ⊙ | ⊙ | ⊙ |
| Example 51C | Urethane | NCO group | 10 | 3 | 0.3 | ⊙ | ⊙ | ⊙ |
| Example 52C | Urethane | NCO group | 10 | 3 | 15 | ⊙ | ⊙ | ⊙ |

| | Maintenance performance of chemical resistance Resin composition used for formation of coating layer | | | Film strength of coating layer Resin composition used for formation of coating layer | | |
|---|---|---|---|---|---|---|
| | Resin composition A | Resin composition B | Resin composition C | Resin composition A | Resin composition B | Resin composition C |
| Example 44C | ⊙ | ⊙ | ⊙ | ⊙ | ⊙ | ⊙ |
| Example 45C | ⊙ | ⊙ | ⊙ | ⊙ | ⊙ | ⊙ |
| Example 46C | ⊙ | ⊙ | ⊙ | ⊙ | ⊙ | ⊙ |
| Example 47C | ⊙ | ⊙ | ⊙ | ⊙ | ⊙ | ⊙ |
| Example 48C | ⊙ | ⊙ | ⊙ | X | X | X |
| Example 49C | ⊙ | ⊙ | ⊙ | ⊙ | ⊙ | ⊙ |
| Example 50C | ⊙ | ⊙ | ⊙ | ⊙ | ⊙ | ⊙ |
| Example 51C | ⊙ | ⊙ | ⊙ | ⊙ | ⊙ | ⊙ |
| Example 52C | ⊙ | ⊙ | ⊙ | ⊙ | ⊙ | ⊙ |

All of the resin beads made of urethane resin, which are shown in the table, have a refractive index of 1.5.

TABLE 5C

| | Type and added amount of resin beads used | | | | | Scratch resistance Resin composition used for formation of coating layer | | |
|---|---|---|---|---|---|---|---|---|
| | Constituent resin of beads | Type of functional group | Number of bonded functional groups (hydroxyl value, KOH mg/g) | Average particle size (μm) | Added amount (parts by mass) | Resin composition A | Resin composition B | Resin composition C |
| Comparative Example 4C | Acrylic | None | — | 3 | 0.3 | X | X | X |
| Comparative Example 5C | Acrylic | None | — | 3 | 15 | X | X | X |
| Example 53C | Acrylic | Hydroxyl group | 1 | 3 | 0.3 | ⊙ | ⊙ | ⊙ |
| Example 54C | Acrylic | Hydroxyl group | 1 | 3 | 15 | ⊙ | ⊙ | ⊙ |
| Example 55C | Acrylic | Hydroxyl group | 5 | 3 | 0.3 | ⊙ | ⊙ | ⊙ |

TABLE 5C-continued

| | | | | | | Maintenance performance of chemical resistance Resin composition used for formation of coating layer | | | Film strength of coating layer Resin composition used for formation of coating layer | | |
|---|---|---|---|---|---|---|---|---|---|---|---|
| | | | | | | Resin composition A | Resin composition B | Resin composition C | Resin composition A | Resin composition B | Resin composition C |
| Example 56C | Acrylic | Hydroxyl group | 5 | 3 | 15 | ⊙ | ⊙ | ⊙ | | | |
| Example 57C | Acrylic | Hydroxyl group | 80 | 3 | 0.3 | ⊙ | ⊙ | ⊙ | | | |
| Example 58C | Acrylic | Hydroxyl group | 80 | 3 | 15 | ⊙ | ⊙ | ⊙ | | | |
| Example 59C | Acrylic | Hydroxyl group | 100 | 3 | 0.3 | ⊙ | ⊙ | ⊙ | | | |
| Example 60C | Acrylic | Hydroxyl group | 100 | 3 | 15 | ⊙ | ⊙ | ⊙ | | | |
| Comparative Example 4C | | | | | | X | X | X | ⊙ | ⊙ | ⊙ |
| Comparative Example 5C | | | | | | X | X | X | ⊙ | ⊙ | ⊙ |
| Example 53C | | | | | | ⊙ | ⊙ | ⊙ | ⊙ | ⊙ | ⊙ |
| Example 54C | | | | | | ⊙ | ⊙ | ⊙ | ⊙ | ⊙ | ⊙ |
| Example 55C | | | | | | ⊙ | ⊙ | ⊙ | ⊙ | ⊙ | ⊙ |
| Example 56C | | | | | | ⊙ | ⊙ | ⊙ | ⊙ | ⊙ | ⊙ |
| Example 57C | | | | | | ⊙ | ⊙ | ⊙ | ⊙ | ⊙ | ⊙ |
| Example 58C | | | | | | ⊙ | ⊙ | ⊙ | ⊙ | ⊙ | ⊙ |
| Example 59C | | | | | | ⊙ | ⊙ | ⊙ | ⊙ | ⊙ | ⊙ |
| Example 60C | | | | | | ⊙ | ⊙ | ⊙ | ⊙ | ⊙ | ⊙ |

All of the resin beads made of acrylic resin, which are shown in the table, have a refractive index of 1.54.

TABLE 6C

| | Type and added amount of resin beads used | | | | | Scratch resistance Resin composition used for formation of coating layer | | |
|---|---|---|---|---|---|---|---|---|
| | Constituent resin of beads | Type of functional group | Number of bonded functional groups (content of NCO in resin beads, % by weight) | Average particle size (μm) | Added amount (parts by mass) | Resin composition A | Resin composition B | Resin composition C |
| Example 61C | Acrylic | NCO group | 1 | 3 | 0.3 | ⊙ | ⊙ | ⊙ |
| Example 62C | Acrylic | NCO group | 1 | 3 | 15 | ⊙ | ⊙ | ⊙ |
| Example 63C | Acrylic | NCO group | 3 | 3 | 0.3 | ⊙ | ⊙ | ⊙ |
| Example 64C | Acrylic | NCO group | 3 | 3 | 15 | ⊙ | ⊙ | ⊙ |
| Example 65C | Acrylic | NCO group | 8 | 3 | 0.3 | ⊙ | ⊙ | ⊙ |
| Example 66C | Acrylic | NCO group | 8 | 3 | 15 | ⊙ | ⊙ | ⊙ |
| Example 67C | Acrylic | NCO group | 10 | 3 | 0.3 | ⊙ | ⊙ | ⊙ |
| Example 68C | Acrylic | NCO group | 10 | 3 | 15 | ⊙ | ⊙ | ⊙ |

| | Maintenance performance of chemical resistance Resin composition used for formation of coating layer | | | Film strength of coating layer Resin composition used for formation of coating layer | | |
|---|---|---|---|---|---|---|
| | Resin composition A | Resin composition B | Resin composition C | Resin composition A | Resin composition B | Resin composition C |
| Example 61C | ⊙ | ⊙ | ⊙ | ⊙ | ⊙ | ⊙ |
| Example 62C | ⊙ | ⊙ | ⊙ | ⊙ | ⊙ | ⊙ |
| Example 63C | ⊙ | ⊙ | ⊙ | ⊙ | ⊙ | ⊙ |
| Example 64C | ⊙ | ⊙ | ⊙ | ⊙ | ⊙ | ⊙ |
| Example 65C | ⊙ | ⊙ | ⊙ | ⊙ | ⊙ | ⊙ |

TABLE 6C-continued

| | | | | | | |
|---|---|---|---|---|---|---|
| Example 66C | ⊙ | ⊙ | ⊙ | ⊙ | ⊙ | ⊙ |
| Example 67C | ⊙ | ⊙ | ⊙ | ⊙ | ⊙ | ⊙ |
| Example 68C | ⊙ | ⊙ | ⊙ | ⊙ | ⊙ | ⊙ |

All of the resin beads made of acrylic resin, which are shown in the table, have a refractive index of 1.54.

DESCRIPTION OF REFERENCE SIGNS

1: Coating layer
2: Base material layer
3: Adhesive layer
4: Barrier layer
5: Sealant layer

The invention claimed is:

1. A battery packaging material which comprises a laminate including at least a coating layer, a base material layer, an adhesive layer, a barrier layer and a sealant layer in this order, wherein
the coating layer is a cured product of a resin composition containing a thermosetting resin and a curing accelerator, and
the thermosetting resin is a benzoguanamine resin.

2. The battery packaging material according to claim 1, wherein the resin composition further contains a slipping agent.

3. The battery packaging material according to claim 2, wherein the slipping agent is a reactive slipping agent having 1 to 3 functional groups that react with the thermosetting resin to be chemically bonded to the thermosetting resin.

4. The battery packaging material according to claim 1, wherein the resin composition further contains a reactive slipping agent that is a block or graft polymer having 1 to 3 functional groups that react with the thermosetting resin to be chemically bonded to the thermosetting resin.

5. The battery packaging material according to claim 1, wherein the resin composition further contains reactive resin beads.

6. The battery packaging material according to claim 5, wherein the reactive resin beads are urethane resin beads or acrylic resin beads having a functional group.

7. The battery packaging material according to claim 5, wherein the reactive resin beads are contained in an amount of 0.1 to 30 parts by mass based on 100 parts by mass of the thermosetting resin.

8. The battery packaging material according to claim 5, wherein the refractive index of the reactive resin beads is 1.3 to 1.8.

9. The battery packaging material according to claim 1, wherein the curing accelerator is at least one selected from the group consisting of an amidine compound, a carbodiimide compound, a ketimine compound, a hydrazine compound, a sulfonium salt, a benzothiazolium salt and a tertiary amine compound.

10. The battery packaging material according to claim 1, wherein the barrier layer is a metal foil.

11. A battery comprising a battery element including at least a positive electrode, a negative electrode and an electrolyte that is stored in the battery packaging material according to claim 1.

12. A method for producing a battery packaging material which comprises a laminate including a coating layer, a base material layer, an adhesive layer, a barrier layer and a sealant layer in this order, the method comprising:
a first step of laminating a base material layer and a barrier layer with an adhesive layer interposed therebetween to form a laminate including the base material layer, the adhesive layer and the barrier layer laminated in this order; and
a second step of laminating a sealant layer on the barrier layer of the laminate obtained in the first step, wherein:
before the first step, after the first step and before the second step, or after the second step, a resin composition containing a thermosetting resin and a curing accelerator is applied to a surface of the base material layer on a side opposite to a surface thereof on which the adhesive layer is laminated, and the resin composition is heated and cured to form a coating layer; and
the thermosetting resin is a benzoguanamine resin.

13. The method for producing a battery packaging material according to claim 12, wherein the resin composition further contains reactive resin beads.

14. A battery packaging material which comprises a laminate including at least a coating layer, a base material layer, an adhesive layer, a barrier layer and a sealant layer in this order, wherein
the coating layer is a cured product of a resin composition containing a thermosetting resin, a curing accelerator and a reactive slipping agent, and
the reactive slipping agent is selected from the group consisting of (i) block polymers having 1 to 3 functional groups that react with the thermosetting resin to be chemically bonded to the thermosetting resin, (ii) fluororesins in which an acrylate is graft-polymerized, and (iii) silicone-modified resins in which silicone is graft-polymerized and which have 1 to 3 functional groups that react with the thermosetting resin to be chemically bonded to the thermosetting resin.

15. The battery packaging material according to claim 14, wherein the curing accelerator is at least one selected from the group consisting of an amidine compound, a carbodiimide compound, a ketimine compound, a hydrazine compound, a sulfonium salt, a benzothiazolium salt and a tertiary amine compound except triethylamine.

16. The battery packaging material according to claim 14, wherein the adhesive layer has a thickness of 2 to 50 μm.

17. A method for producing a battery packaging material which comprises a laminate including a coating layer, a base material layer, an adhesive layer, a barrier layer and a sealant layer in this order, the method comprising:
a first step of laminating a base material layer and a barrier layer with an adhesive layer interposed therebetween to form a laminate including the base material layer, the adhesive layer and the barrier layer laminated in this order; and
a second step of laminating a sealant layer on the barrier layer of the laminate obtained in the first step, wherein:
before the first step, after the first step and before the second step, or after the second step, a resin composition containing a thermosetting resin, a curing accelerator and a reactive slipping agent is applied to a surface of the base material layer on a side opposite to a surface thereof on which the adhesive layer is laminated, and the resin composition is heated and cured to form a coating layer; and the reactive slipping agent is selected from the group consisting of (i) block polymers having 1 to 3 functional groups that react with the thermosetting resin to be chemically bonded to the thermosetting resin, (ii) fluororesins in which an acrylate is graft-polymerized, and (iii) silicone-modified resins in which silicone is graft-polymerized and which have 1 to 3 functional groups that react with the thermosetting resin to be chemically bonded to the thermosetting resin.

\* \* \* \* \*